United States Patent [19]

Flamme et al.

[11] Patent Number: 6,070,539

[45] Date of Patent: Jun. 6, 2000

[54] VARIABLE RATE AGRICULTURAL PRODUCT APPLICATION IMPLEMENT WITH MULTIPLE INPUTS AND FEEDBACK

[75] Inventors: David D. Flamme, Hinsdale; Paul Haack, Crystal Lake; Abe Orbach, Naperville; Keith Wendte, Hinsdale, all of Ill.

[73] Assignee: Case Corporation, Racine, Wis.

[21] Appl. No.: 09/079,755

[22] Filed: May 15, 1998

Related U.S. Application Data

[63] Continuation-in-part of application No. 08/822,432, Mar. 21, 1997, Pat. No. 5,915,313, and a continuation-in-part of application No. 08/935,406, Sep. 23, 1997, Pat. No. 5,924,371.

[51] Int. Cl.⁷ ........................................................ A01C 7/00
[52] U.S. Cl. ............................... 111/177; 111/903; 701/50
[58] Field of Search ....................................... 111/903, 200, 111/177, 915, 904, 130; 221/211; 239/61, 63, 64, 65; 701/50

[56] References Cited

U.S. PATENT DOCUMENTS

| | | |
|---|---|---|
| Re. 35,100 | 11/1995 | Monson et al. . |
| 3,073,606 | 1/1963 | Hurt . |
| 3,511,411 | 5/1970 | Weiss . |
| 4,333,096 | 6/1982 | Jenkins et al. ........................ 111/903 X |
| 4,369,895 | 1/1983 | McCarty et al. .......................... 111/903 |
| 4,555,624 | 11/1985 | Stefen ................................. 111/903 X |
| 4,630,773 | 12/1986 | Ortlip . |
| 4,710,757 | 12/1987 | Haase ................................. 111/903 X |
| 5,220,876 | 6/1993 | Monson et al. . |
| 5,260,875 | 11/1993 | Tofte et al. .......................... 111/903 X |
| 5,301,848 | 4/1994 | Conrad et al. ........................ 111/903 X |
| 5,355,815 | 10/1994 | Monson . |
| 5,453,924 | 9/1995 | Monson et al. . |
| 5,598,794 | 2/1997 | Harms et al. . |
| 5,635,911 | 6/1997 | Landers et al. ........................ 111/903 X |
| 5,646,846 | 7/1997 | Bruce et al. .......................... 111/903 X |
| 5,841,282 | 11/1998 | Christy et al. ........................ 111/903 X |
| 5,924,371 | 7/1999 | Flamme et al. ........................ 111/903 X |
| 5,956,255 | 9/1999 | Flamme ............................... 111/903 X |
| 5,963,139 | 10/1999 | Littke ................................. 111/903 X |

FOREIGN PATENT DOCUMENTS

| | | |
|---|---|---|
| 0 181 308 B1 | 3/1991 | European Pat. Off. . |
| WO 91/03148 | 3/1991 | WIPO . |

*Primary Examiner*—Victor Batson
*Attorney, Agent, or Firm*—Foley & Lardner

[57] ABSTRACT

One or more agricultural products, such as seed, fertilizer, herbicide and pesticide, may be dispensed at each of a plurality of row locations on an agricultural implement toolbar. A local bus connects each local metering device to a local controller at the row location, which may also have actual product application rate and soil characteristic sensors. The local controllers are connected through a system bus to a central processor mounted on the tractor, which is connected to a memory for storing product prescription and actual application maps, and also to a GPS receiver for determining current location in the field. Each local controller controls the agricultural product metering device(s) at the row location as a function of the last commanded rate received from the processor and the actual rate as sensed at the row location. The commanded rate may be derived by the processor as a function of multiple variables as stored in levels of the prescription map, or from a manual override signal from the operator.

31 Claims, 13 Drawing Sheets

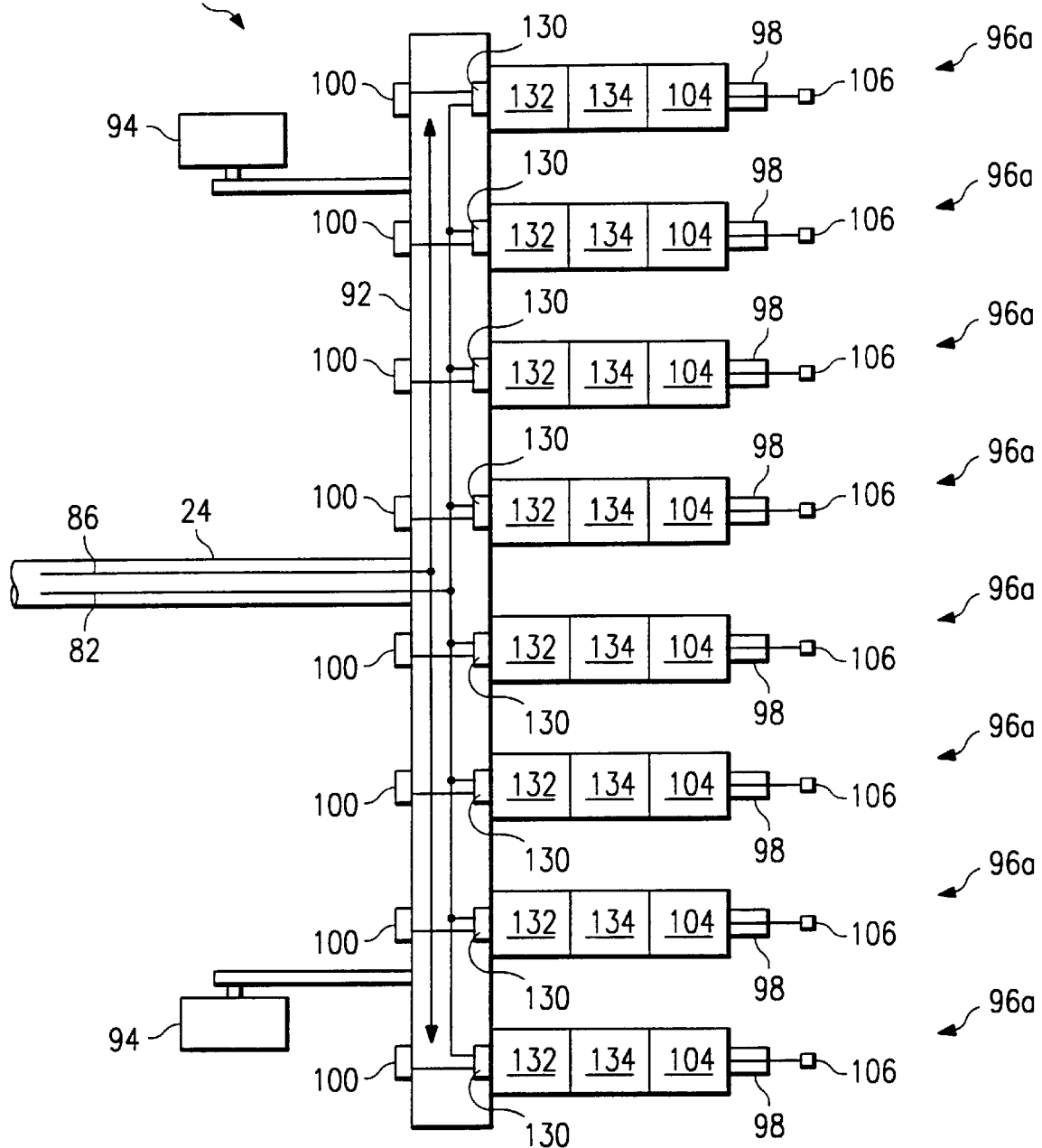

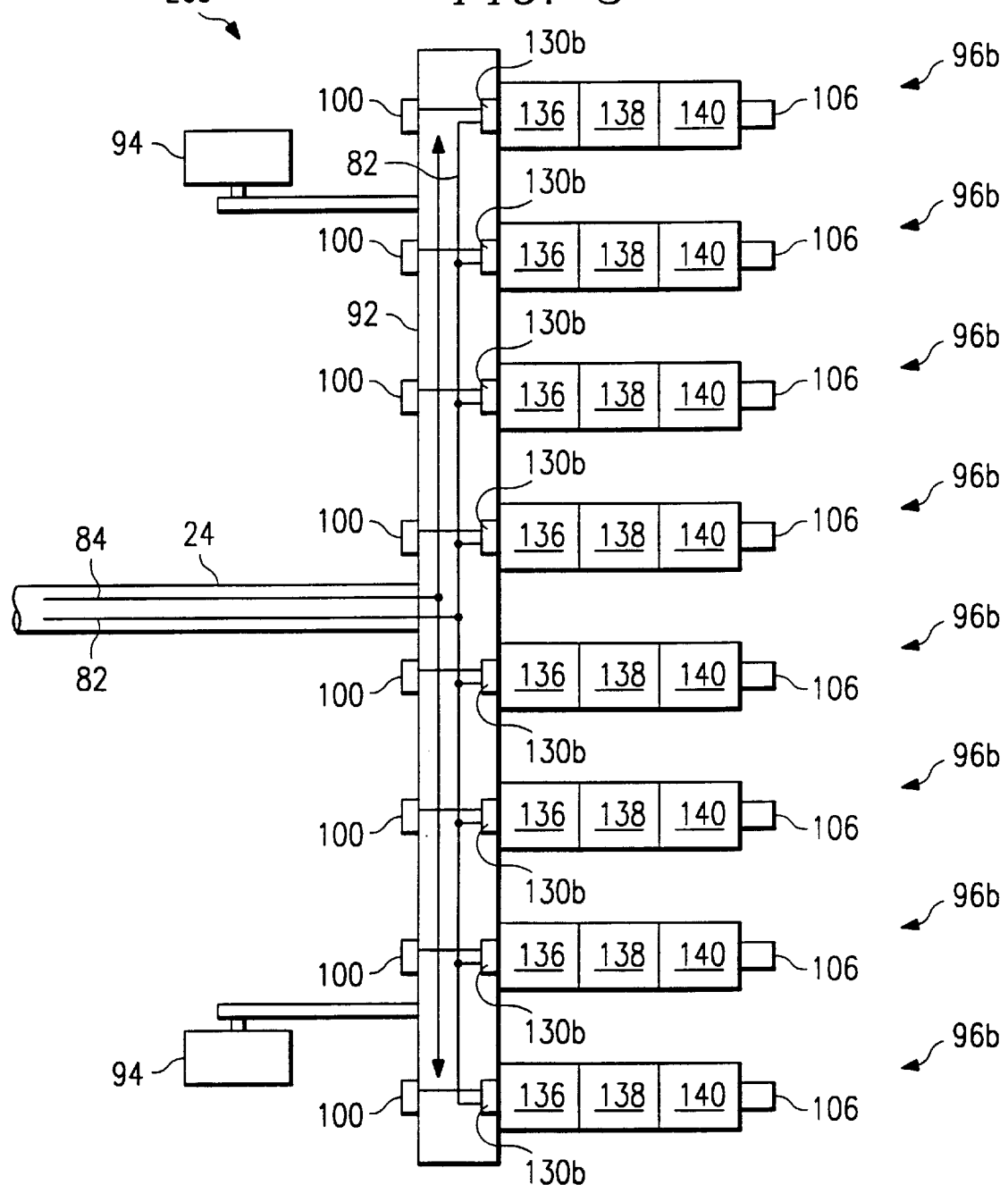

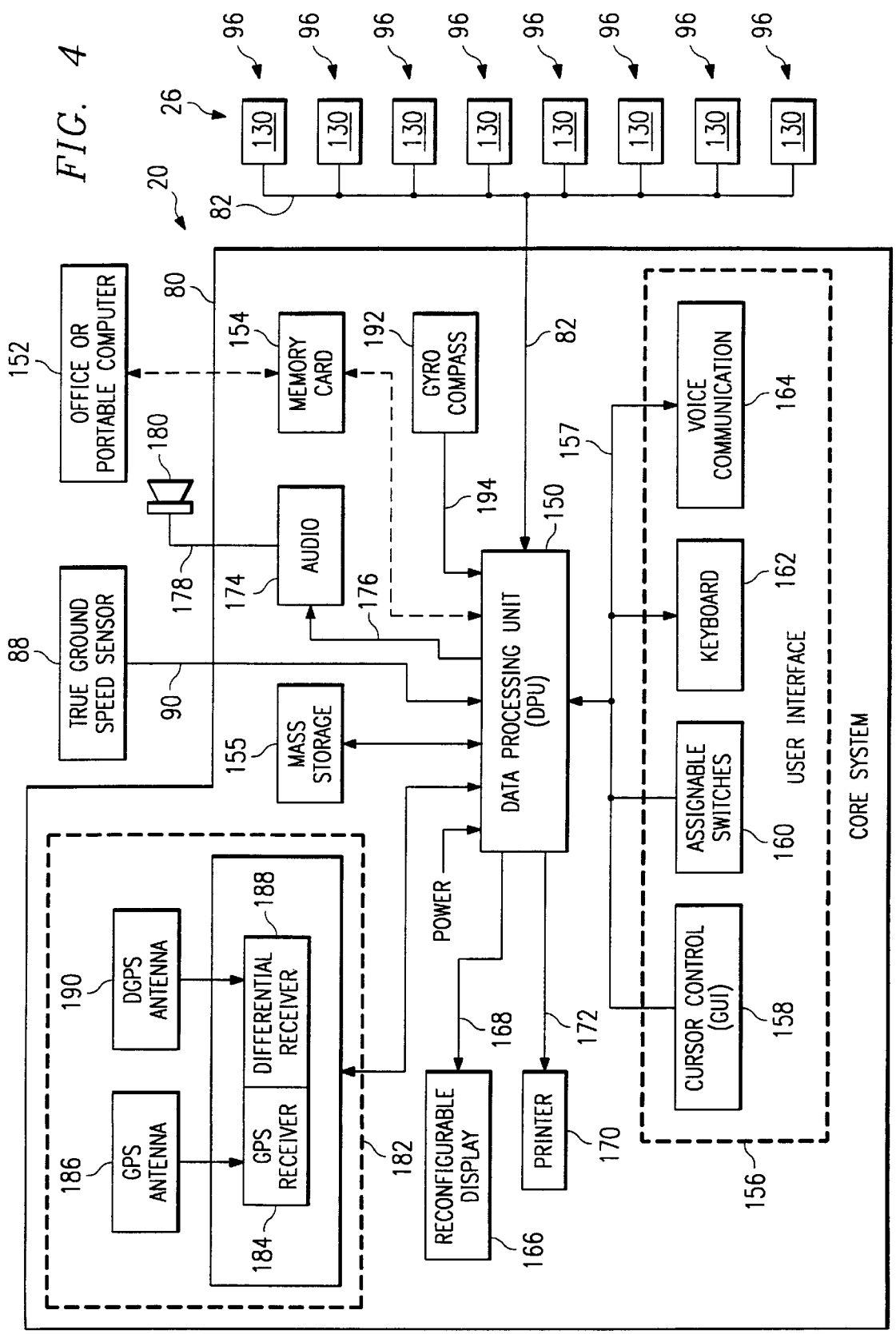

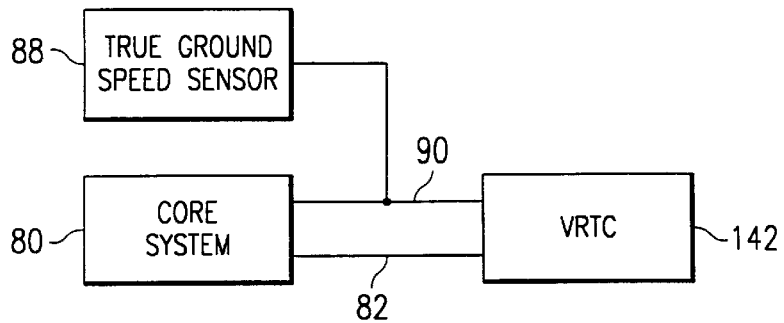
FIG. 4a
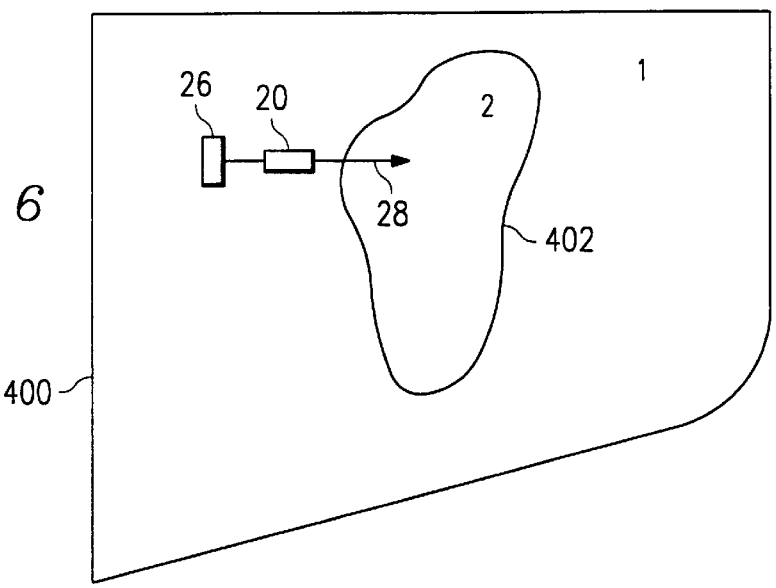
FIG. 6
FIG. 7

FIG. 5a

| DATA POINT NO. | LONGITUDE | LATITUDE | SEED APPLICATION RATE (SEEDS/ACRE) | SEED APPLICATION TYPE | SOIL DEPTH, ft. | [H$_2$O] | [N] | [P] | [K] |
|---|---|---|---|---|---|---|---|---|---|
| 1 | -88.7291520 | 39.0710720 | 24000 | 1 | 0.98 | 0.13 | 11 | 21 | 15 |
| 2 | -88.7291140 | 39.0710720 | 24100 | 2 | 2.4 | 0.12 | 5 | 7 | 5 |
| 3 | -88.7290720 | 39.0710740 | 24200 | 2 | 2.3 | 0.05 | 17 | 34 | 17 |
| 4 | -88.7290320 | 39.0710760 | 24200 | 1 | 1.7 | 0.21 | 18 | 30 | 14 |
| 5 | -88.7289890 | 39.0710740 | 24200 | 2 | 0.6 | 0.39 | 3 | 1 | 2 |
| ... | ... | ... | ... | ... | ... | ... | ... | ... | ... |

FIG. 5b

| DATA POINT NO. | PESTICIDE RATE | PESTICIDE TYPE | GREENNESS | SLOPE | HERBICIDE RATE | HERBICIDE TYPE | N RATE | P RATE | K RATE |
|---|---|---|---|---|---|---|---|---|---|
| 1 | 20 | 1 | 0.30 | 0.00 | 10 | 1 | 10 | 10 | 10 |
| 2 | 30 | 1 | 0.50 | 0.07 | 8 | 2 | 5 | 10 | 5 |
| 3 | 30 | 1 | 1.00 | 0.09 | 8 | 2 | 15 | 5 | 5 |
| 4 | 20 | 2 | 0.95 | 0.15 | 9 | 3 | 20 | 10 | 10 |
| 5 | 30 | 1 | 0.93 | 0.21 | 10 | 2 | 20 | 5 | 10 |
| | | | 0.85 | 0.01 | | | | | |
| ... | ... | ... | ... | ... | ... | ... | ... | ... | ... |

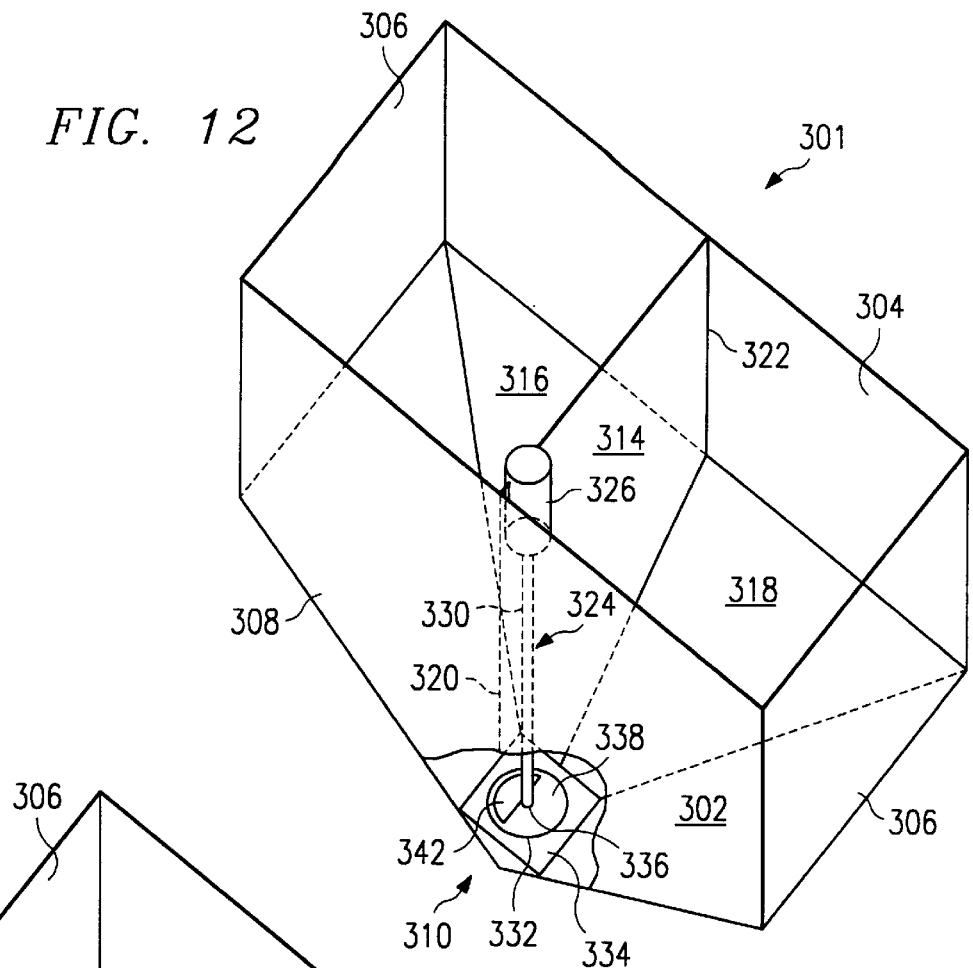
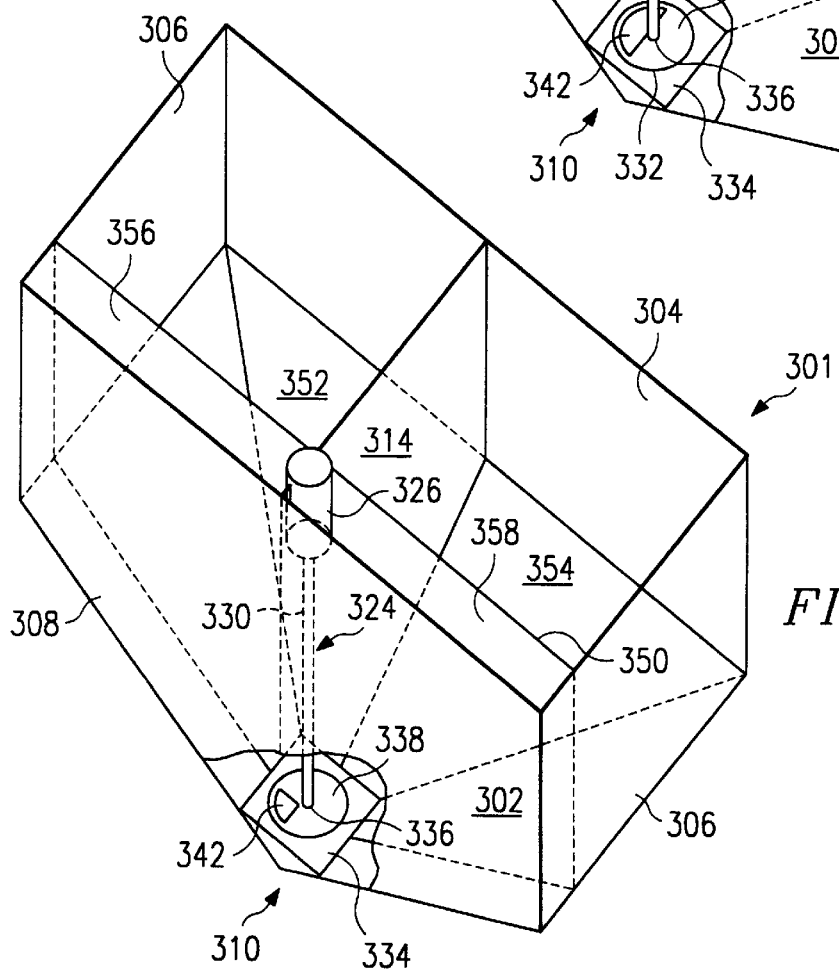

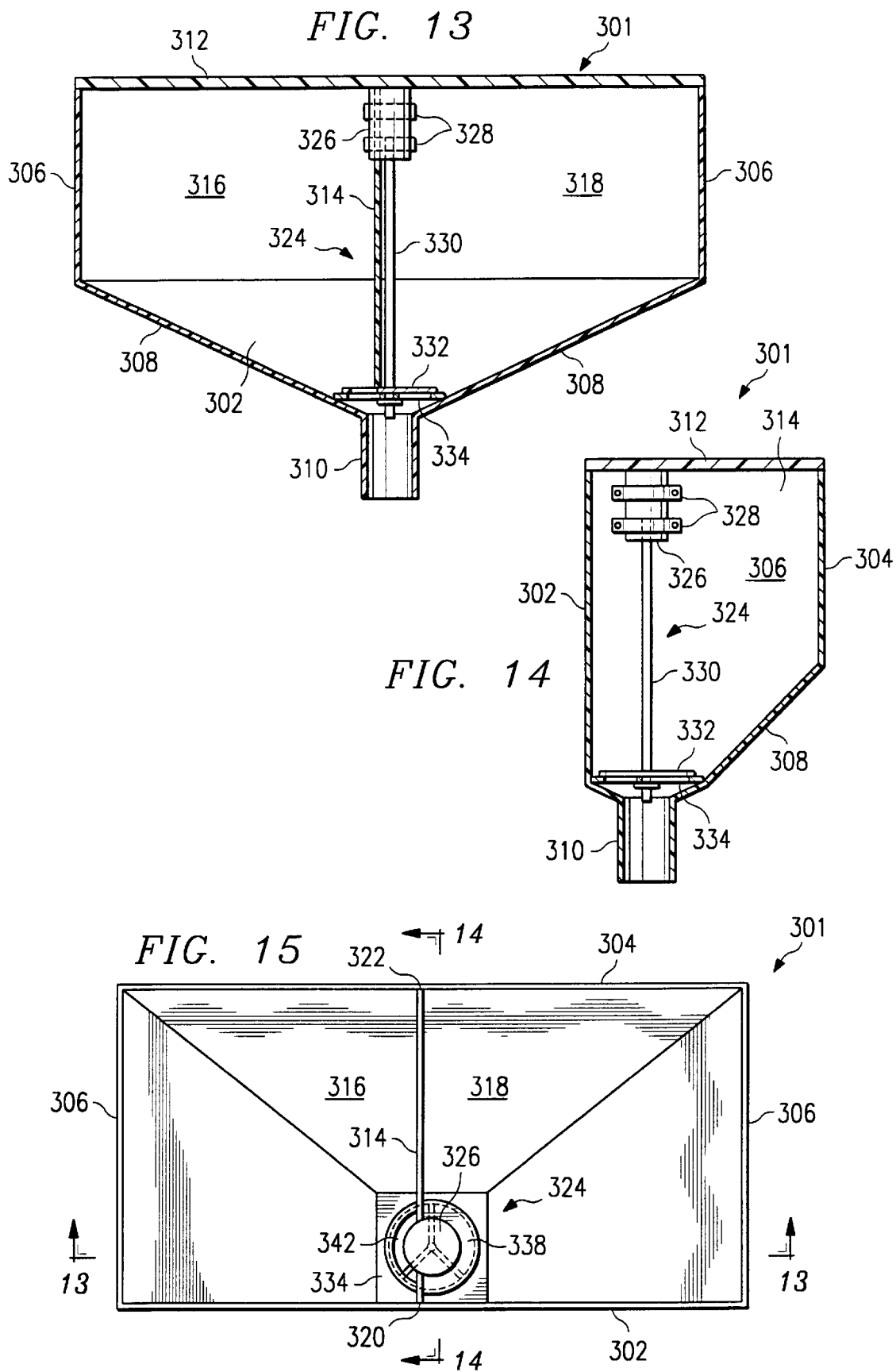

6,070,539

VARIABLE RATE AGRICULTURAL PRODUCT APPLICATION IMPLEMENT WITH MULTIPLE INPUTS AND FEEDBACK

CROSS REFERENCE TO RELATED APPLICATIONS

This application is a continuation in part of application Ser. No. 08/822,432 filed Mar. 21, 1997 now U.S. Pat. No. 5,915,313, issued on Jun. 29, 1999, commonly assigned to the assignee hereof and fully incorporated by reference herein. This application is a continuation in part of application Ser. No. 08/935,406 filed Sep. 23, 1997 entitled "Global Controller and Distributed Local Controller(s) for an Agricultural Implement", issued on Jul. 20, 1999 to Flamme et al. as U.S. Pat. No. 5,924,371.

TECHNICAL FIELD OF THE INVENTION

The present invention relates in general to agricultural product application implements, such as planters, drills and applicators of fertilizers, pesticides and herbicides. More particularly, the present invention relates to an agricultural product application implement of one or more of the above varieties which uses multiple sensor and other data inputs to control current application rate, and which may employ feedback to adjust current application rate.

BACKGROUND OF THE INVENTION

Agricultural implements on modern, commercially-viable farms typically are towed or carried by tractors and perform one or more operations on each of a plurality of rows, most commonly eight. The tractor pulls the implement in a direction parallel to the row. For each row, a row unit, typically mounted on a tool bar, performs an operation on the row as the tractor travels forward, such as planting or drilling seed, fertilizing or applying pesticide or herbicide. Conventionally, the rate of planting, fertilization or application of pesticide or herbicide, and the types of agricultural products so deposited, are set in advance of the farmer's entry into the field, and stay in this condition until the current operation is completed on that field.

The farmer, and therefore the agricultural implement manufacturer, is constantly exploring ways to increase yield per acre and efficiency. One approach is to increase agricultural product application accuracy and placement, thus reducing waste even in the context of a constant application rate. Representative of such implements in the subclass of planters and drills are Case Corporation's 955 Series of EARLY RISER CYCLO AIR® planters, each of which has a central-fill seed hopper for storing seed and a pneumatic seed metering and distribution system to each of a plurality of row units on the tool bar; Case Corporation's EARLY RISER plate planter family; and Case Corporation's 5300, 5400, 5500, 7100 and 7200 drills, which have a variety of row numbers, spacings and seeding widths. These planters and drills apply a single type of seed stored in a seed hopper.

Conventional agricultural practices have treated fields as having characteristics which are constant throughout the field. However, different locations in a field may have dramatic differences in nutrient level, soil depth, insect pressure, weed pressure, drainage, field slope, soil type and other characteristics—and these in turn generate discernable and recordable differences in yield history. More recent practice, therefore, has been to treat a field as having variant characteristics from location to location and to vary the application of an agricultural product as a function of these characteristics. Implements and systems exist which are capable of applying herbicides, insecticides and fertilizers on a site-specific basis; this has become known as prescription farming. Application Ser. No. 08/822,432 filed Mar. 21, 1997, to which this application is related, applies prescription farming techniques to the planting of different seed types in the same field.

Still, further improvements could be made. For example, there is sometimes a difference between the theoretical rate of application, or the rate of application that the designers of the apparatus intend to be applied, and the actual rate of application. While the difference and the rate of change of the difference may be small in many circumstances, the difference and its rate of change may become large because of mechanical malfunction. It therefore would be useful to regulate agricultural product deposition according to actual, real-time implement performance. Further, since at least one agricultural product is applied to a field in an area-variant manner, it would be useful to change the application rates of other agricultural products to take the variation of the first product and the field into account. Finally, present apparatus treat a multiple-row product dispenser as dispensing product to an area having constant characteristics across the width of the toolbar, when in fact substantial variations in critical characteristics may exist from one row to the next. Prescription rates and types could therefore vary among row locations.

SUMMARY OF THE INVENTION

According to one aspect of the invention, apparatus for applying an agricultural product to a field includes a controller mounted on or coupled to a vehicle for moving over the field. The controller is coupled to a memory for storing a theoretical rate of application of the agricultural product. The controller transmits a metering device control signal representative of this theoretical rate of application to an agricultural product metering device.

The metering device dispenses a quantity of the agricultural product which varies according to the metering device control signal. A sensor mounted on or coupled to the vehicle, and measuring an actual rate of application of the agricultural product being dispensed by the metering device, sends an actual rate signal to the controller. The controller compares the actual rate with the stored theoretical rate and alters the metering device control signal as a function of the actual rate and the theoretical rate in order to get a closer match between the two.

According to another aspect of the invention, an agricultural product dispenser, such as a planter, drill, fertilizer sprayer or the like, has a toolbar with a plurality of agricultural product metering devices mounted along its length. The toolbar has a length oriented at an angle to the direction of travel, such as 90 degrees. A processor is mounted on the vehicle and is coupled to each of the metering devices to transmit respective agricultural meeting device control signals to control, on an individual metering device basis, the dispensing of the agricultural product onto the field. A geographical location device coupler, such as a GPS receiver, supplies a geographical location signal to the processor. The processor in turn derives the geographical location of each of the metering devices as a function of the signal.

The processor is further coupled to a memory for storing an agricultural application prescription map. The processor generates each metering device control signal as a function of its respective geographical location and the prescription map. In this way, application rates may be varied among the different row units on the toolbar.

According to a further aspect of the invention, the memory coupled to the controller stores a map of the field including a plurality of different parameters, one of them being crop greenness taken from an image of the field. This crop greenness datum is used in varying the rate and type of agricultural products dispensed.

According to a further aspect of the invention, the memory coupled to the controller is adaptable to store a map of soil depths in the field. The controller generates metering device control signal as a function of the geographical location of the row unit and a soil depth datum for that row unit. According to another aspect of the invention, soil depth is obtained, in whole or in part, from a sensor mounted forward of the row unit on the toolbar.

According to a still further aspect of the invention, an agricultural product metering device is coupled to the controller for receiving a metering device control signal, the metering device dispensing a quantity of the agricultural product which varies according to the metering device control signal. A sensor is mounted near or after the agricultural metering device to measure the actual rate of application of the agricultural product, the sensor then generating an actual rate signal. In one variant, the sensor retrieves an image of the soil after the agricultural product has been dispensed; this image is then processed by the controller. According to another variant of this sensor, the sensor may sense the massage close to it of a seed or quantity of agricultural product, and record what was actually dispensed onto the field.

The controller generates an alarm signal if the actual rate is too different from a stored theoretical rate. An alarm circuit coupled to the controller generates an alarm responsive to receiving the alarm signal from the controller. This alarm warns the user that the metering device requires recalibration or is experiencing malfunction.

One technical advantage of the invention is that the farmer will no longer have to guess what rates of agricultural product the dispenser is placing; he or she will have actual data. These data may, in turn, be used as portions of multi-level actual application maps to vary the application of other agricultural products. For example, if an insect-resistant corn seed (such as BT corn) was used within a particular area, the insecticide can be reduced or eliminated for that area, with obvious benefits in efficiency and possibly also environmental effect.

A further technical advantage inheres in the invention's capability of monitoring actual application rate and comparing it with the theoretical application rate, and either automatically adjusting the first to conform with the second within a predetermined tolerance band, or actuating an alarm for the tractor driver.

According to another technical advantage, current product application rates may be made to vary not only according to parameters previously stored within an agricultural prescription map, but also according to data gathered in real time. These data may, for example, include a spectroscopic soil analysis to determine present nutrient levels, present soil depth, or even the likelihood of precipitation within the next half-hour. The present invention takes farming from prescription-map farming, itself an improvement over prior art static practices, to expert system farming, in which historical and real-time data are retrieved and combined to produce elevated efficiency and precision of application, and results which tend even more toward optimum.

BRIEF DESCRIPTION OF THE DRAWINGS

Further aspects of the invention and their advantages will be discerned in the following detailed description, in which like characters identify like parts and in which:

FIG. 2 is a schematic plan view of an alternative embodiment of the invention, showing per-row seeding variation;

FIG. 3 is a schematic view of a fertilizer/pesticide/herbicide multiple row applicator according to the invention;

FIG. 4 is a schematic electrical diagram of the core system, vehicular sensors and row unit controllers according to the invention;

FIG. 4a is a schematic diagram of a row implement control system according to an alternative embodiment of the invention;

FIGS. 5a and 5b together form a schematic diagram illustrating a multiple-level prescription, application and characteristic map;

FIG. 6 is a schematic diagram of a variable stored as a portion of a prescription/application map for a field, shown storage in the form of polygons;

FIG. 7 is a representation of the field of FIG. 6, in which the same variable is stored as a plurality of pixels with coordinates;

FIG. 12 is an isometric view of a multiple bin seed hopper for use with the invention;

FIG. 13 is an elevational view of the seed hopper shown in FIG. 12;

FIG. 14 is a front-to-back sectional view of the seed hopper shown in FIG. 12;

FIG. 15 is a plan view of the seed hopper shown in FIG. 12, FIG. 13 being taken substantially along line 13—13 of FIG. 15, and FIG. 14 being taken on a section substantially along line 14—14 of FIG. 15;

FIG. 17 is an isometric view of a four-bin seed hopper according to the invention;

DETAILED DESCRIPTION OF ILLUSTRATED EMBODIMENT

Figure 1:
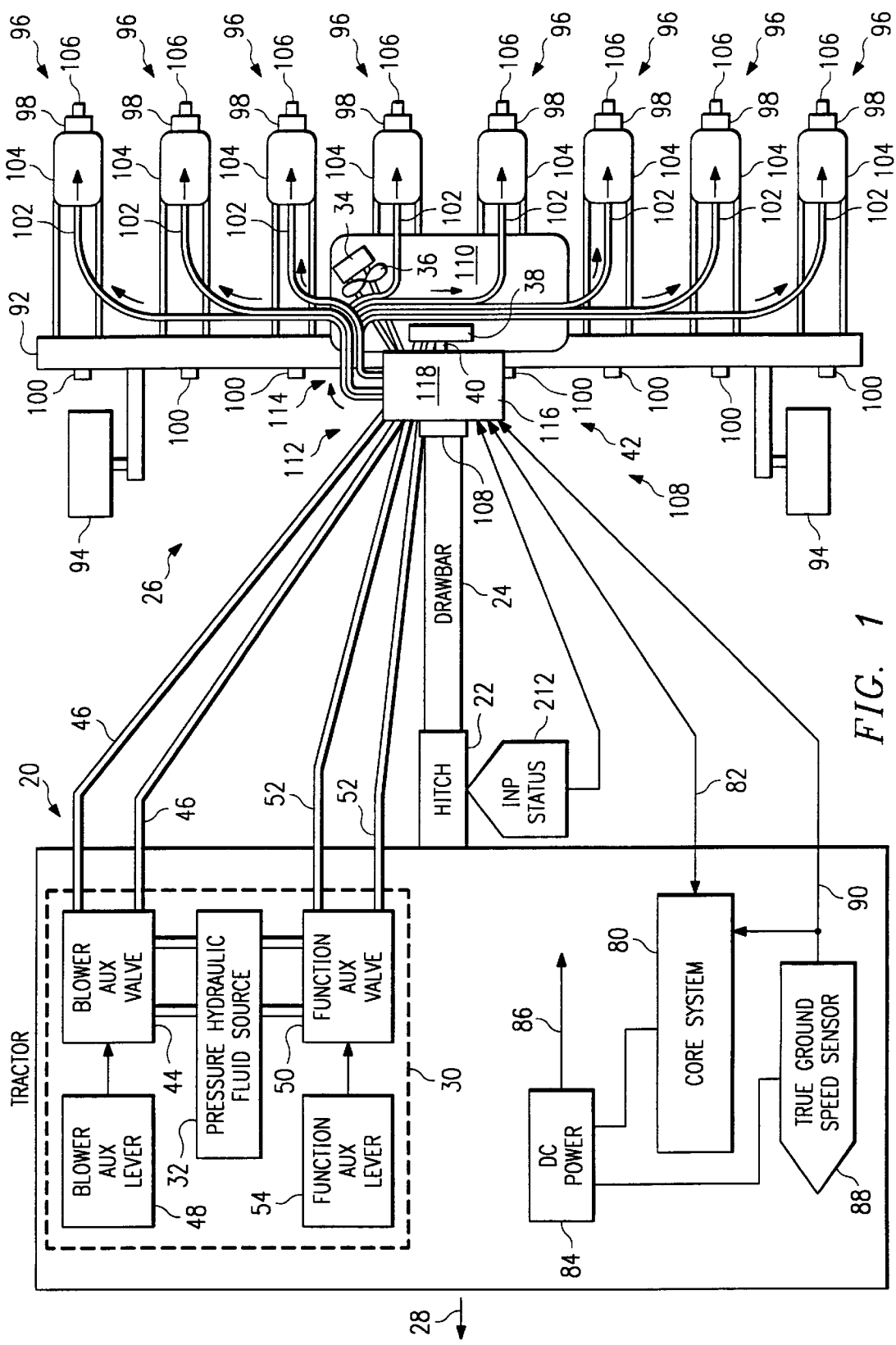
FIG. 1 is a schematic plan view of an agricultural product metering implement and system according to the invention.

Referring to FIG. 1, an agricultural vehicle such as a tractor 20 includes a hitch assembly 22 for connection to a draw bar 24 of an agricultural product application implement 26. The tractor 20 includes an engine and drivetrain (not shown) for propelling tractor 20 and implement 26 in a forward direction represented by arrow 28. The tractor 20 may be a MAGNUM® tractor, and implement 26, in the embodiment illustrated in FIG. 1, may be a 955 Series CYCLOAIR® planter, both made by Case Corporation. Some features of the CYCLOAIR® planters are described in U.S. Pat. Nos. 3,762,603; 3,848,552; 3,860,146; 3,885,704; 4,128,191 and 4,758,119, all commonly assigned to the assignee hereof and incorporated by reference herein. Other tractors and prime movers can be used to move other types of agricultural product placement implements, including planters, drills and applicators of herbicides, pesticides and fertilizers in granulated and fluid form. While the implements, including implement 26, illustrated in this application are all of the trailing variety, the implement 26 can also be of the mounted or semi-mounted type.

The tractor 20 includes an auxiliary (AUX) hydraulic system 30, indicated by the dotted line enclosure, for supplying pressurized hydraulic fluid from a source 32 (e.g., an engine-driven pump) to attachments such as the implement 26. AUX hydraulic system 30 is capable of powering two hydraulic motors on the illustrated implement 26: a blower hydraulic motor 34 which drives a fan 36 to generate air pressure used for seed metering and distribution, and a function hydraulic motor 38 which turns a shaft 40 to drive a central metering system indicated generally at 42. In other embodiments illustrated herein, up to eight or more hydraulic motors may be used on the trailing implement 26, and hydraulic system 30 is sized and controlled to provide sufficient pressure and volume of hydraulic fluid to these motors.

In the embodiment illustrated in FIG. 1, a blower AUX valve 44 controls the flow of fluid via conduits 46 to the blower hydraulic motor 34, responsive to the position of a blower AUX lever 48, and a function AUX valve 50 controls the flow of fluid via conduits 52 to the function hydraulic motor 38, responsive to on the position of a function AUX lever 54. AUX levers 48 and 54, located in the tractor cab, are treated herein as turning the fluid flow to implement 26 on and off, and it is assumed that the operator will set both levers to provide sufficient power for the hydraulic motors 34 and 38. In alternative embodiments, fluid to the hydraulic motors 34 and 38, and to the other hydraulic motors disclosed herein, can be supplied by a closed hydraulic system on the implement itself, as driven by a power take off shaft of the tractor 20 (not shown).

Tractor 20 is also equipped with a core system 80 which communicates with the implement 26 via a bus 82 (e.g., a bidirectional RS-485 interface) as described below. The tractor 20 has a DC power source 84 which supplies power to the core system 80 and to various motors and sensors on the implement 26 through a suitable power connection shown schematically at 86. DC power source 84 of course powers other instruments and functions of the tractor 20, and conventionally is a 12 volt battery.

The tractor 20 also has a true ground speed sensor 88, such as a radar device, mounted to the body of the tractor 20. The true ground speed sensor, powered by DC power source 84, sends a signal via a bus 90 at least to the core system 80, and in the illustrated embodiment also to the central metering system 42. The signal sent from the radar device 88 generates a signal with a frequency proportional to ground speed. The sensor 88, however, can otherwise include or consist of a magnetic pick up sensor which senses the speed of the vehicle's undriven wheels. An estimated true ground speed can also be obtained from a pick up sensor associated with the driven wheels or the transmission, and send to the core system 80.

The implement 26 illustrated in FIG. 1 includes a frame 92 (i.e., a toolbar) pulled by the tractor 20 with the drawbar 24 and supported above the ground by carrying wheels 94. Secured to the frame 92 are a plurality of row units each indicated generally at 96. The row units 96 and parts thereof are preferably secured to the frame 92 using bolts or other removable fasteners for flexibility in changing the row spacing and row unit configuration and type. In the embodiment illustrated in FIG. 1, the row units 96 form furrows in the ground and plant dispensed seed in the furrows, and may include offset disc openers (not shown) to penetrate residue and soil, gauge wheels (not shown) to maintain constant planting depth and seed placement, furrow forming points (not shown) to define the seed trenches formed by the disc openers, applicators to place seed in the furrows, covering discs (not shown) to fill the furrows and press wheels 98 to compress soil back over the furrows.

In the embodiment illustrated in FIG. 1, each of the row units 96 has several components. Conveniently mounted on the front side of the toolbar 92 are a plurality of soil depth and/or chemical sensors (fore sensors) 100 which sense the characteristics of the soil prior to the application of the agricultural product being deposited by the respective row unit 96. The toolbar 92 will be pulled in direction 28 at a relatively slow speed, such as 7–12 mph, translating to about ten to eighteen feet per second. The core system 80, the local controller (not shown; see FIG. 2) and sensors 100 have a tenth of a second to sense data, use the data in forming a control signal, and adjust product deposition rate based on the sensed data. This is within the realm of accomplishment with modern processing speeds and electromechanical response times. To the extent that more time is needed, sensors 100 should be displaced more forwardly of the dispensing devices; in an alternative embodiment (not shown), they could be mounted on a boom forward of tractor 20.

Each row unit 96 further has a seed planter and a seed tube 102 connected thereto, which in the embodiment illustrated in FIG. 1 delivers seed from a central seed dispensing system 42. Each row unit 96 further has a chemical hopper 104 provided to store a chemical, such as a fertilizer, applied during planting. One or more aft sensors 106 per row unit 96 are mounted at a position to sense the ground after the deposition of the agricultural product has occurred and may be used to measure, as by a spectrographic analysis, the concentrations of nutrients, pesticides or herbicides extant after the passage of the implement 26. The sensors 100 and 106 are connected by a suitable communications bus or a set of lines (not shown in FIG. 1) to a central seed dispensing system 108.

The central agricultural product dispensing system 108 is mounted at a central location at the toolbar 92 and includes an enclosure 110 for enclosing a blower assembly 34–36, a function assembly 38–40, a central-fill hopper (see hopper 301 in FIGS. 12–17) for storing multiple types of seed, a switch assembly 324 (FIG. 12) for selecting a type of seed, and components of a central variable rate and type control system (FIG. 12). The dispensing system 108 includes a distribution assembly 112 which in turn includes the central metering system 42 for metering individual seeds, and a delivery system 114 for delivering the metered seeds to the row units 96. The metering system 42 and the delivery system 114 include, in the illustrated embodiment, a singulator or seed selector 116 for separating individual seeds which are deposited into a manifold for delivery to the row units 96 via the seed tubes 102.

In FIG. 1, the seed-delivery portion of the dispensing system 108 is a pneumatic system which uses pressurized air for metering and distributing seed. However, in alternative embodiments, portions of the dispensing system 108 may be used on planting apparatus such as gravity planters, such as a fluted roll movable with respect to an outlet gate, or planters using air pressure only for the metering or only for distribution. The seed stored in enclosure 110 is released as described below into the bottom of a perforated drum 118 secured to the shaft 40 and forming a part of the singulator 116. The drum 118 has holes arranged in circular rows along its axis (e.g., eight rows for an eight-row planter), each row having a plurality of holes each with a diameter smaller than the seed being planted. The arrangement of the drum 118 depends upon the planter and seed type, and Case Corporation makes a full line of interchangeable drums. The blower assembly 34–36 pressurizes the drum 118 and creates an air pressure differential above atmospheric pressure. As the function assembly 38–40 rotates the drum 118, the pressure differential causes each hole to pick up one seed at the bottom of the drum 118, and retains the pickedup seed against the hole as drum 118 rotates. After further rotation moves the retained seeds above the manifold, the holes are plugged by release wheels (not shown) outside the drum 118 to eliminate the force retaining the seeds and to cause the seeds to drop into the manifold. The seeds are then pushed by a cushion of pressurized air from the blower assembly 34–36 through the seed tubes 102 to the individual row units 96.

The seed application rate depends upon ground speed and the rotation rate of drum 118. In the instance that the user wishes a constant application rate, it may be obtained by driving shaft 40 via a transmission (not shown) that is coupled to one or both of the carrying wheels 94. However, in the likely instance that the user wishes a variable application rate, it may be obtained by controlling the rotation rate of the drum 118 as a function of the ground speed and a commanded application rate as encoded in a rate/type signal delivered by bus 82. The shaft 40 is driven at a variable rate by the function-hydraulic motor 38. This variable rate depends upon settings of an electrohydraulic valve (not shown), also within the enclosure 110. The valve receives fluid from the function AUX valve 50 and regulates flow to the hydraulic motor 38 in response to control signals generated as described below.

Associated with each of the chemical hoppers 104 is a variable rate applicator (not shown). This applicator, preferably power by DC power source 84, is connected to the central product dispensing system 108 via a communications bus (not shown; see FIG. 2). The dispensing rate of the chemical in each of the hoppers 104 is determined according to ground speed from sensor 88, a prescription rate/type signal provided by the core system 80, and preexisting soil characteristics (depth, moisture concentration, nutrient concentration) as determined by the sensors 100, which are also communicated to the product dispensing system 108 by the communication bus. As will be described in more detail in conjunction with FIG. 8, seed prescription rate may also be controlled as a multivariable function by the core system 80.

FIG. 2 illustrates an alternative implement indicated generally at 26a. In the implement 26a, there is no central agricultural product dispensing system 108 (FIG. 1); instead, each of the row units 96a is independently operated by a row unit controller 130. Each row unit 96a also includes at least two seed hoppers 132 and 134, containing different types of seed. Each row unit 96a applies the different types of seed and chemicals from the chemical hopper 104, which may be divided into several compartments (not shown) by means of mechanisms controlled by its controller 130. For its row unit, the controller 130 receives signals from its fore sensor array 100 and aft sensor 106, and passes these on by bilateral communications bus 82 to the core system 80 (FIG. 1). The core system 80, in return, sends agricultural product rate and/or type control signals on the bilateral communications bus 82 to each of the controllers 130 individually.

FIG. 3 is a schematic diagram of a further alternative implement indicated generally at 26b. Like the implement 26a shown in FIG. 2, the apparatus mounted on the implement 26b relies on electrical power rather than pneumatic power, although one may be substituted for the other for any particular function. Implement 26b is designed to apply chemicals of various kinds either after or before the planting operation. As in implement 26a, a distributed series of processors or controllers 130b are respectively mounted in proximity to each row unit 96b, and locally control the functions of that particular row unit. This includes the gathering of data from sensors 100, 106, and possibly other sensors (not shown), and forwarding them onto the core system via communications bus 82, and receiving instructions on communications bus 82 from the core system 80.

In the embodiment illustrated in FIG. 3, each of the row units 96b is fitted with three chemical hoppers 136. 138 and 140. These are removably mounted onto the toolbar so that they may be individually switched out. In one configuration, the hoppers 136, 138 and 140 may contain fluid fertilizer containing predetermined amount of nitrate, phosphate and potassium, respectively. In another configuration, hopper 136 may contain fertilizer, hopper 138 may contain herbicide, and hopper 140 may contain pesticide. The application rates from each of these hoppers is individually controlled by the row unit controller 130b to apply a varying rate of chemicals to the row. More or fewer hoppers may be affixed to each row unit station and controlled by local controller 130b.

Referring to FIG. 4, the core system 80 includes a data processing unit (DPU) 150 for receiving, processing and communicating site-specific data including spatially-variable data representing prescribed rates and types of agricultural products throughout a field. The DPU 150 communicates via the bus 82 with each of the row unit controllers 130. With respect to the embodiment shown in FIG. 1, the bus 82 would communicate with a central variable rate/type controller 142, as shown in FIG. 4a.

The data processing unit 150 further communicates with external systems, such as an office computer 152, via a memory card 154. The memory card 154 may be used to transfer geo-referenced agricultural product type and rate maps (both prescription and application or feedback maps) between the computer 152 and the data processing unit 150 and can be a Type 2 PCMCIA card from Centennial Technologies, Inc. The memory card 154 may store information concerning seed type, seed rate, fertilizer type and rate, herbicide type and rate, pesticide type and rate, soil depth, water and sensed and prescribed chemical composition parameters prior to product application, and chemical composition parameters of the soil after product application. While memory card 154 is preferred because it is solid state, other means of communicating data to external systems could be used, such as hard disks, CD ROMs, floppy diskettes, radio frequency or infrared wireless systems, or even RS-232/485 hardwire buses or other media. The data processing unit 150 receives true ground speed signals from the sensor 88.

The data processing unit 150 includes a digital processor (e.g., a Pentium or Pentium II-class microprocessor) and memory, including nonvolatile memory (PROM, EEPROM or flash EPROM) to store instructions executed by the processor and volatile (DRAM, SDRAM and/or SRAM) memory which may have a battery back-up circuit. The instructions and data may be retrieved from and stored to a mass storage unit 155, such as a magnetic medium, as necessary. However, in the place of a general-purpose microprocessor programmed with algorithms suitable to carry out the invention, specific-purpose or hard-wired logic circuitry could be used. The DPU 150 communicates with an operator through a user interface, indicated by the dashed enclosure at 156, via a bus 158 (e.g., an RS-232/485 or keyboard interface). The interface 156 may include, for example, a graphical user interface (GUI) 158 providing cursor control, such as a mouse, joystick or four-way switch with up, down, right and left positions. The interface 156 may further include assignable switches 160 (e.g. pushbuttons), configurable by the processor or preassigned), a keyboard 162 and a voice communication interface 164.

The DPU 150 generates display signals applied to a reconfigurable display 166, which may be of the CRT or flat screen varieties. The display signals are sent via a bus 168. The display 166 may include an active-matrix LCD display capable of displaying alphanumeric characters, graphics and full motion video in a number of colors under varying ambient light condit̃he curr display 166 is used, among other things, to display the current configuration of the assignable switches 160, the configuration of implement 26 and row units 96 thereon, and product application data (e.g., status, prescription application and control data). The DPU 150, interface 158 and display 166 are located in the cab for easy access to user interface 158 and a substantially unobstructed view of the display 166. The DPU 150 may also communicate with a printer 170 via a communications path 172 (e.g., an RS-232 link).

According to the invention, the DPU 150 is capable of generating an alarm to the user. This may be done via an audio interface card or circuit 174 and audio communications path 176. The audio card 174 in turn generates audio signals on line 178 to one or more speakers located in the cab and indicated schematically at 180. The DPU 150 may also generate a visual alarm on the display 166, alone or in combination with the sound produced by speaker 180.

The DPU 150 also communicates with a location signal generation circuit, indicated at 182 by the dashed enclosure, which generates location signals representing the position of tractor 20. The circuit 182 includes a global positioning system (GPS) receiver 184 with an associated antenna 186, and a differential GPS (DGPS) receiver 188 with an associated antenna 190. A single antenna may be used in place of antennas 186 and 190. GPS receiver 184 may be of a type supplied by Trimble Navigation Limited of California, and DGPS receiver 184 may be of a type available from Satloc, Inc. of Arizona. The GPS receiver 184 determines longitude and latitude coordinates and the altitude of the vehicle 20 from signals transmitted by the GPS satellite network. The accuracy of the position data is improved by applying correction signals received by DGPS receiver 188. The differential correction signals are used to correct errors on GPS signals including the selective availability error signal added to GPS signals by the U.S. Government. DGPS correction signals are transmitted by the U.S. Coast Guard and/or commercial services. For example, the Omnistar DGPS system from John E. Chance and Associates of Texas includes a network of land-based differential reference stations which send correction signals to a master station, which in turn uploads signals to a satellite for broadcast throughout North America. DGPS signals may also be transmitted from a local base station such as the top of a building. In one embodiment, DPU 150 interfaces with the SATLOC L-band integrated TerraStar DGPS system via an RS-485 communication link.

From the position of the GPS antenna 186 and DGPS antenna 190, the data processing unit 150 can derive the geographical positions of each of the row units 96 by determining direction of travel 28 (FIG. 1) and adding an x/y offset for each of the row units. The direction of travel 28 can be obtained from a gyrocompass 192 via a data path 194; the direction of travel 28 may alternatively be determined by inspecting a last obtained point from the location signal generation circuit 182 and comparing it to the current location point.

Referring to FIGS. 5a and 5b, DPU 150 is provided with predetermined geo-referenced maps or data layers 196 via the memory card 154. Each map 196 is generated by office computer 152 based on field parameters which affect the desired types and rates of the agricultural products which will be applied. Maps are preferably implemented by a geographical information system (GIS) database stored as a data file in card 154, and can be represented by a table wherein rows represent field positions and columns represent longitude/latitude coordinates, product application rates and product application types for each field position. The maps 196 are capable of recording several different types of data for each data point. These include seed application rate, seed application type, soil depth, the sensed concentrations of water, nitrogen, phosphorus and potassium, pesticide rate, pesticide type, herbicide rate, herbicide type, slope, greenness, and application rates of nitrogen, phosphorus and potassium fertilizers. Crop greenness may, for example, be obtained from images retrieved by airplane overflights or satellites.

The map format shown in FIGS. 5a and 5b is also used when DPU 150 generates maps, called application maps; indicating the actual types and rates of agricultural product applications. These maps may be matched to the prescription maps. The actual rates depend on rate and concentration feedback data transmitted from row unit controllers 130. The actual rates, types and concentrations at the data points are correlated with location signals received from location signal generation circuit 182 representing positions in the field at which the agricultural product was applied; as previously stated, the DPU 150 applies appropriate offsets to come up with different points for each one of the row units 96. The reported data, as correlated to geographical reference points, are stored as layers in the memory card 154 and/or mass storage unit 155.

FIG. 6 represents a predetermined geo-referenced map of a field 400 which includes spatially variable data indicative of prescribed types of an agricultural product. A particular type of agricultural product, such as a fertilizer at a first concentration, is prescribed around the parameter of field 400 and an agricultural product of a second type, such as that fertilizer at a greater concentration, is prescribed for an interior area delineated by polygon 402. For example, polygon 402 may be an area of high relief from which herbicides, pesticides or fertilizer have a tendency to wash away, or may be a depression in which such chemical have a tendency to collect. Areas 1 and 2 may also be representative of two different seed types. Area 1, for example, may be more susceptible to invasion from insect-friendly adjacent areas, and therefore should be planted with an insect-resistant seed type. Area 2 may be planted with more conventional seed. Prescription rates, actual application rates, and water and other sensed chemical concentrations can be represented in a similar manner.

The current positions of tractor 20 and implement 26 are shown by the indicated markers, and the expected course of travel as shown by arrow 28. Since the row units are accorded individual geographic locations, the times of entry into polygon 402 will be slightly different from each other. Further, if the direction of travel 28 happens to be momentarily colinear with the boundary of polygon 402, it is possible that some of the row units or implement 26 will enter into the polygon, while others will not. Therefore, the row units are controlled independently of each other.

As shown in FIGS. 6 and 7, prescription type and rate maps for any agricultural product may be stored using polygon or raster representations. In FIG. 6, each polygon surrounds an area of the field 400 having the same prescription type or rate, and only the vertices of the polygons are stored. In FIG. 7, each raster (e.g., square block with sides equal to or an even multiple of the length of a row unit 96) includes an area having the same prescription type or rate. The numeral in each polygon or block represents the type or rate of the agricultural product prescribed. A comparison of FIGS. 6 and 7 reveals that both representations can store the same prescription or application map. Polygons generally use less memory and are more accurate. However, the accuracy of raster representations can be made equal to polygon representation by decreasing the block or pixel size.

The present invention contemplates the storage of several "layers" of data for the field 400, FIG. 7 representing only one such layer. Other layers of data are used to store field parameters such as soil depth, soil type chemical concentration, seed type and rate, records of the concentrations of agricultural products actually deposited, etc.

In operation, the DPU 150 (FIG. 4) transmits signals to each controller 130 for controlling the agricultural product deposition process. For example, the DPU 150 receives the location signals generated by location signal generation circuit 182 and determines the current positions of the row units 96 therefrom, uses those current positions as indices to the agricultural product type and rate prescription maps stored in card 154, calculates commanded agricultural product rates and types based on stored algorithmic relationships, and then transmits rate and type signals indicative of the commanded rate(s) and type(s) to each controller 130 via the bus 82. To reduce bus traffic, the DPU 150 will transmit information packets to particular ones of the controllers 130 only if there is a change of state in commanded rate or type from the last condition. In response to signals from the DPU 150, each controller 130 will control the rate and type of agricultural product dispensed and will send back application signals to the DPU 150 which represent the actual rate and type of the agricultural product which has been placed. The DPU 150 correlates the actual rate and type of agricultural product dispensed with the positions of the row units 96 and creates actual rate and type application feedback maps therefrom, for storage in memory card 154.

The switches 160 can be assigned by DPU 150 to provide the operator with control over the agricultural product deposition process. In one embodiment, a switch 160 will be assigned to be a seed type switch for generating signals to select desired type of seed as the switch is manually moved among positions each representing a seed type. The DPU 150 reads the type signals and transmits the desired type to each controller 130, which in turn causes the dispensing of the desired type. In another embodiment, one switch 160 may be assigned to be a product type switch and another switch 160 may be assigned to be a mode switch having manual and automatic positions. If manual mode is selected, the DPU 150 will read the type and mode signals and transmit the desired type of e.g. seed to each of the selected controller 130; otherwise, the DPU 150 will transmit prescribed types of seed based upon the prescription map if automatic mode is selected. Similarly, an input device, such as a switch or potentiometer 160, can be provided to allow manual selection of a desired rate, and a switch 160 can be assigned to be a rate mode switch to select between manual and automatic rate modes wherein DPU 150 respectively transmits the desired seed rate in manual mode and the prescribed seed rate in automatic mode. Similar provisions may be made for fertilizer, insecticide and herbicide. Depending upon the precise tasks assigned the implement 26, the DPU 150 may configure the switches 160 to provide a manual override feature for each of the products dispensed onto the field.

The user interface 156 may also be configured to allow an operator to enter configuration signals for variable rate and type applications which are transmitted to the controllers 130. Configuration data can include constants required by the controllers 130, such as row width and the parameters of the dispensing units which the controllers operate (e.g., for hoppers 132, 134 (FIG. 2), seed constant). Changes in configuration data allow an operator to easily change dispensing units of each one of the row units 96 for different types of seed, fertilizer, herbicide or pesticide, or to reconfigure the system for different dispensing implements. In one embodiment, the DPU150 will derive some or all of the correct configuration data by querying each controller 130, which in turn may automatically determine how many and which kind of agricultural product dispensing devices are at its row location 96.

Figure 8:
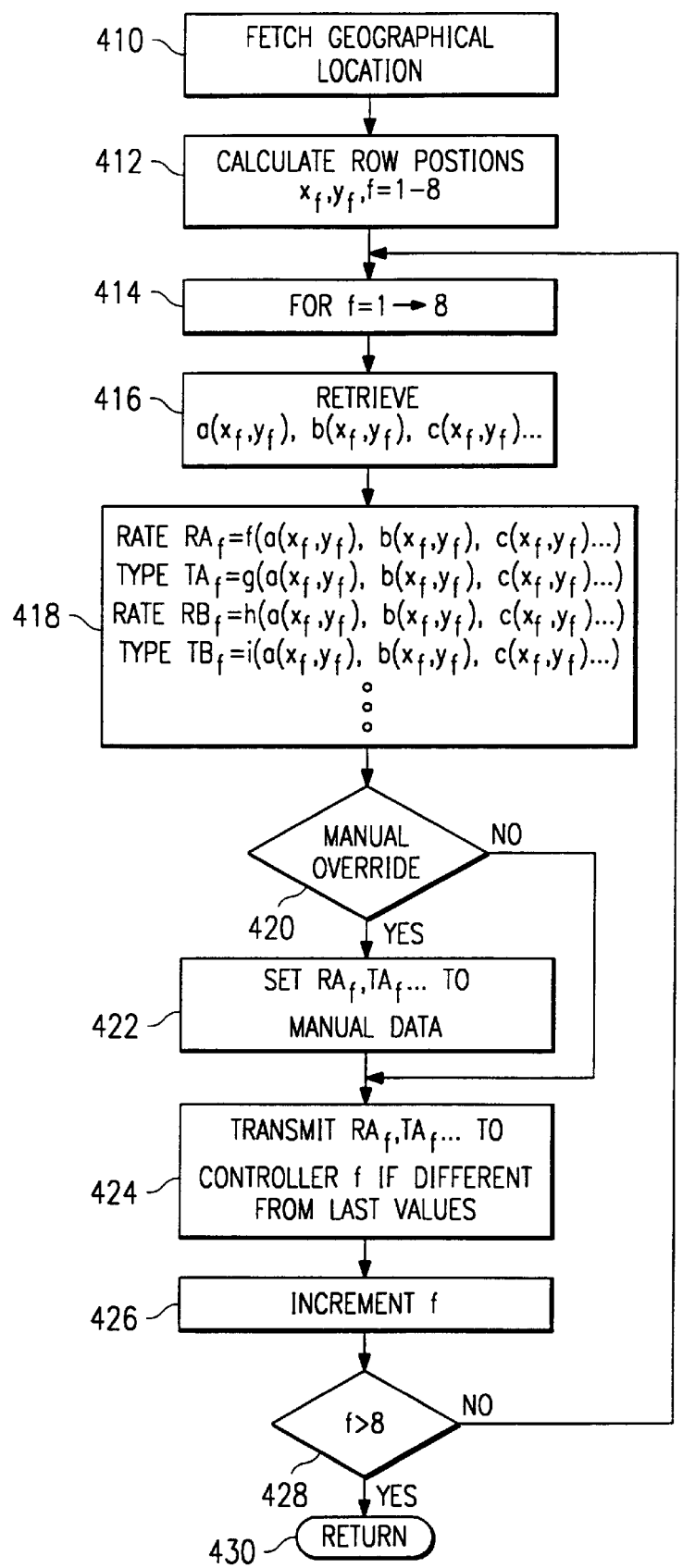
FIG. 8 is a schematic block diagram illustrating a possible algorithm for the calculation and transmission of commanded rate and type information by a central processor to a row position controller.

FIG. 8 is a simplified illustration of an algorithm which may be executed by DPU 150 in transmitting information, as needed, over the bus 82 to the controllers 130. In the beginning of this sequence at step 410, the geographical location is fetched, as from a buffer associated with the GPS/DGPS location signal generation unit 182 (FIG. 4). At step 412, the individual row locations 96 are calculated by applying appropriate offsets to the central geographical location derived at step 410.

At step 414, a loop is executed for each row position 96 (FIG. 4); in this example, eight such row positions are assumed. Since $X_f$ and $Y_f$, the coordinates for row position F, are known, the DPU 150 is able to retrieve variables a $(x_f, y_f)$, b $(x_f, y_f)$, c $(x_f, y_f)$, from the prescription map stored in the memory card 154. Vectors a, b, c . . . are retrieved as necessary to determine rates and types of agricultural product application at step 416. Different variables may be retrieved according to the different functions employed. For example, to apply one particular agricultural product, the user may decide that the rate of deposition should only vary according to soil depth, in which case, only one variable would need to be retrieved from the prescription map. Other agricultural product types or rates may depend on a combination of many such variables, in which a plurality of such variables for the particular geographical location $X_f$, $Y_f$ would be retrieved. Some of these variables may be based on geographically specific data of other agricultural products already deposited. For example, a previously deposited seed type may be used to influence or dictate a current deposition of herbicide.

At step 418, the DPU 150 calculates a commanded rate and a commanded type for each of a plurality of agricultural products, ranging from one to many. Equations for rate $RA_f$, type $TA_p$, rate $RB_p$, and type $TB_f$ are given by way of illustration. These may, for example, be the seed rate and type and a fertilizer rate and type for one particular variety of fertilizer. Rates and types may also be calculated for any other kind of agricultural product which the implement 26 is capable of placing.

At decision step 420, the DPU 150 queries whether or not the operator has entered a manual override. For example, the DPU 150 may have calculated a particular rate and type of seed at step 418, but the operator may desire another rate or type to be placed instead. If a manual override condition exists, as would be sensed by an input from one of the assignable switches 160 (FIG. 4), the affected rates and/or types are set to what has been manually entered or to predetermined presets which are applied only upon the activation of a manual switch by the operator, all at step 422. Whether or not there has been a manual override, at step 424 the DPU 150 will transmit rate and type information, but only if these are different from the last information transmitted to the particular controller 130 at the row position f. Otherwise, no transmission will occur.

At step 426, row position f is incremented and at step 428, the DPU 150 determines whether or not the row position f is greater than eight. If this is the case, the program returns at step 430 to fetch the next geographical location at step 410; otherwise, the program loops to step 414 and the procedure repeats.

Figure 9:
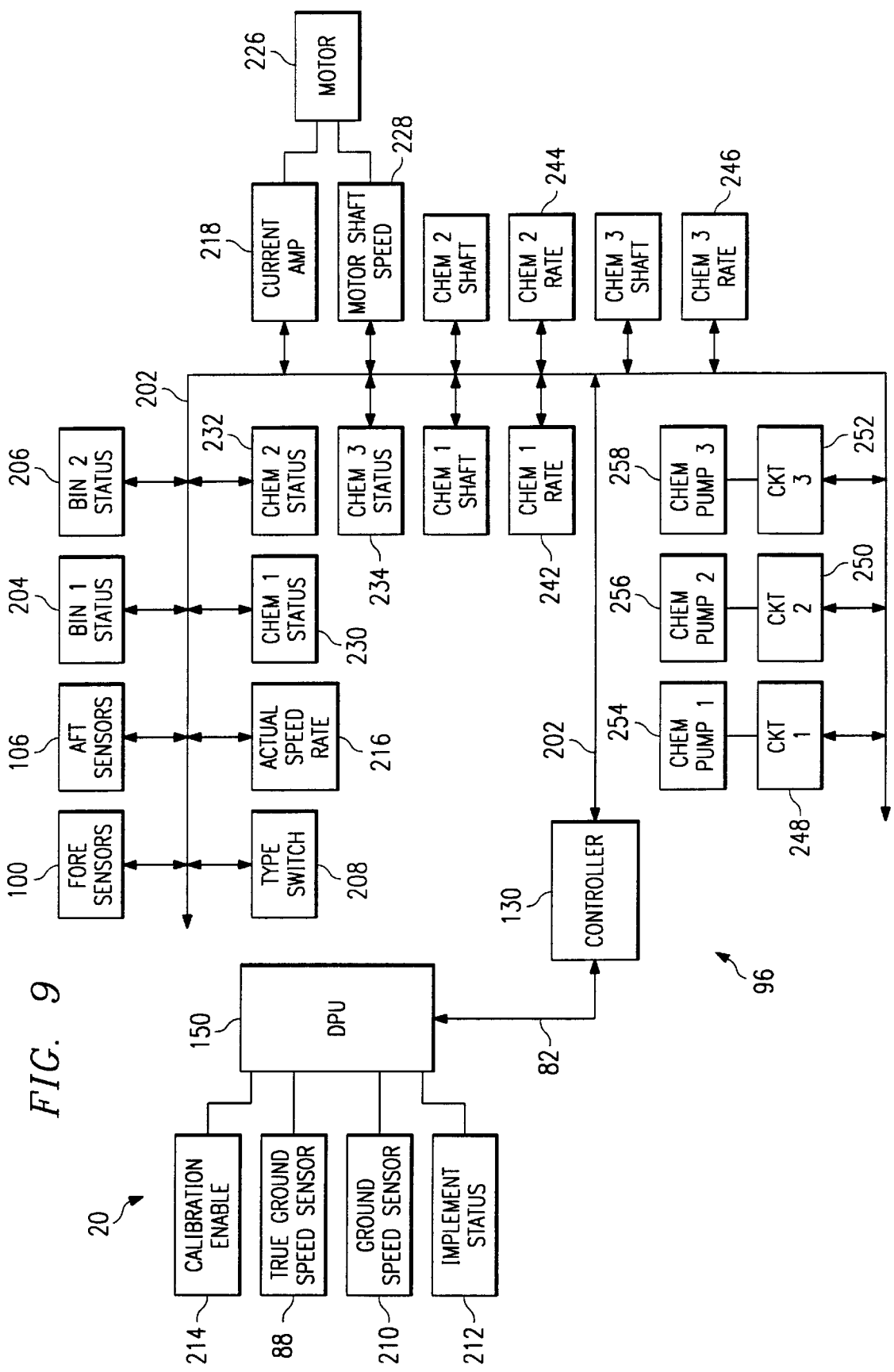
FIG. 9 is a schematic electrical diagram of an electronic control system of a single row unit according to the invention.

Referring next to FIG. 9, the electrical interconnections at each row position or node are shown in more detail, one such row position or node 96 being shown together with certain general system components mounted on the vehicle. As described above, processor 150 receives true ground speed signals from the true ground speed sensor 88. The DPU 150 also receives signals from a redundant ground speed sensor 210, which for example may be mounted on the implement 26 instead of the vehicle 20. The redundant ground sensor 210 may, for example, be coupled to one or more of the wheels 94 (FIG. 1) and provides a redundant ground speed signal to the DPU 150. The redundant ground sensor 210 further may, for example, include an encoder-type sensor generating 360 pulses/revolution, such as the Dickey-John P/N 46436-0170. The DPU 150 compares the redundant ground speed signal with the true ground speed signal to determine if the latter is erroneous. Errors may occur because ground speed sensor 88 may generate false speed signals under certain conditions; for example, waving grass may cause the generation of ground speed signals indicating a nonzero speed even if the vehicle 20 is standing still.

The DPU 150 also receives signals from an implement status switch 212. The implement status switch 212 provides status signals indicative of whether implement 26 is raised or lowered. If mounted, the implement 26 is raised and lowered by hitch 22 (FIG. 1) in response to actuations of a hitch raise/lower switch (not shown), and switch 212 is located on the hitch. If towed or trailed, the implement 26 is moved between an engaged position and a disengaged position by a hydraulic actuator which receives hydraulic fluid from another AUX valve (not shown) under operator control, and switch 212 is coupled to the carrying wheels 94. The DPU 150 will disable and enable agricultural product dispensing by processors 130 depending on whether the implement 26 is in position to dispense the product(s). For example, if implement 26 is raised on a headland, product application is stopped by signaling controller 130 to this effect, controller 130 in turn setting the various application rates for product dispensers installed at that row location to zero.

A calibration enable switch 214 is mounted on implement 26 at a location accessible to an operator standing beside the implement 26. The calibration enable switch 214 sends an enable/disable signal to the DPU 150, which relays this signal to each of the controllers 130. All of these signals, which are used by each of the local controllers 130 (one shown in FIG. 9), are passed on to the controller 130 via vehicle/implement communications bus 82. To minimize traffic, DPU 150 will only send signals on bus 82 to each controller 130 when a change in state occurs affecting that particular node or row position 96.

The controller 130 communicates via a local bus 202 to a variety of sensors and controls mounted at its row position. These include one or more fore sensors 100, which sense the condition of the ground prior to the application of the dispensed agricultural product(s) and which may include a spectrometer and/or a soil depth detector, and which may send signals indicative of soil depth and spectrographic signature to the controller 130. This information may be used in regulating the amount of agricultural product dispensed by controller 130; for example, a high water reading or low soil depth may be used to reduce or prohibit the dispensing of seeds in that area, and/or a high nitrate reading may be used to reduce the amount of applied nitrogen fertilizer. The aft sensor(s) 106 send signals encoding the condition of the ground after the agricultural product application has been accomplished; these signals may represent such things as fertilizer (N, P, K) concentration, herbicide/pesticide concentration, or seed density. These data are transmitted by controller 130 to central data processing unit 150 on bus 82, and may be used by data processing unit 150 to complete an application map of the field.

Seed bin sensors 204 and 206 are coupled to respective seed bins 132, 134 (FIG. 2) and are configured to generate signals when the seed remaining in the corresponding bin falls below a predetermined level. The status signals are transmitted to controller 130 on local bus 202. The controller 130 may be programmed to automatically switch between bins when one bin becomes empty, with or without notifying the operator through DPU 150. In the instance where the operator is notified, controller 130 may await permission, via manual switch actuation, before switching bins. Alternatively, controller 130 may simply send an alarm to the operator to notify him or her of the impending depletion of one or the other of the seed bins, and await a manual reset after the operator manually switches bins or refills the seed bin involved. The sensors 204 and 206 are preferably optical.

Controller 130 further receives signals indicative of actual seed rate from a sensor 216, which may be a seed counting sensor in the instance that the seed dispenser is a singulator. The actual seed rate may be used to modify the theoretical seed rate in a manner explained below. Actual seed rate sensor 216 may also be used to inform controller 130, and ultimately the operator, that the seed has run out.

The controller 130 provides seed type control signals to a type switch 208, and seed rate control signals to a current amplifier circuit 218. The amplifier circuit 218 converts the voltage signals received on bus 202 to current and applies a modulating current to a seed rotor motor 226. This motor in turn is responsible for turning a local drum for dispensing of seed from one of the selected seed bins, or in the instance where a singulator is not used, turns a shaft for the dispensing of multiple seeds. A motor shaft speed sensor 228 senses the rotational speed of the shaft of motor 226 and reports this to the controller 130 to provide a feedback loop. In alternative embodiments, in which the dispensing of seed is hydraulically controlled, the current amplifier 218 may be a pulse width modulating (PWM) solenoid current amplifier, which would be used to actuate a PWM solenoid (not shown) that would control a hydraulic valve on (in that embodiment hydraulic) motor 226.

The seed application rate signals send to current amplifier 218 are calculated by the controller 130 as a function of the true ground speed and the rate as commanded from DPU 150. The data processing unit 150 uses the following equation to determine the commanded shaft speed:

Shaft speed=(gear ratio×ground speed×rate×row width)/(seed constant×CONSTANT).

In the above equation, the gear ratio is a unitless measure of application rate sense revolutions/seed dispenser revolutions, ground speed is in MPH, the rate is a commanded rate measured in seeds per acre or other convenient unit area, the row width is the distance between planted rows in inches, the seed constant is the number of seeds per revolution of the dispenser, and the CONSTANT is a unitless quantity, such as 1/5940, for equalizing the different units used by the equation.

Similar to the seed bin status sensors 204 and 206, chemical status sensors 230, 232 and 234 are provided to sense the fill level of the respective chemical hoppers, such as hoppers 136, 138 and 140 as illustrated in FIG. 3. The bus 202 may also be connected to chemical hopper status indicators (not shown) which will inform the controller 130 of which dispensing devices are mounted at, and activated for, that row location. In the illustrated embodiment, each of the chemicals is applied by means of a DC motor in which the rate of application is a function of motor shaft speed and ground speed. Therefore, shaft speed sensors 236, 238 and 240 are provided to sense shaft speeds which will be mathematically related to a respective theoretical rate of application of each chemical. Actual rate sensors 242, 244 and 246, which for example may be turbines on the hopper gates, sense actual rates of application, and provide signals indicative of these actual rates back to the controller 130.

The controller 130 sends control signals to respective power circuits 248, 250 and 252, which in turn regulate DC motor current to each of a plurality of DC motor actuated pumps 254, 256 and 258. The control signals to power circuits 248, 250 and 252 may be adjusted as a function of a commanded rate from DPU 150, the ground speed, the sensed motor shaft speed from shaft sensors 236, 238, 240, the actual rates of application as provided by sensors 242, 244 and 246, and the previous condition of the row to which the chemicals are being applied, as provided by fore sensors 100.

Figure 10:
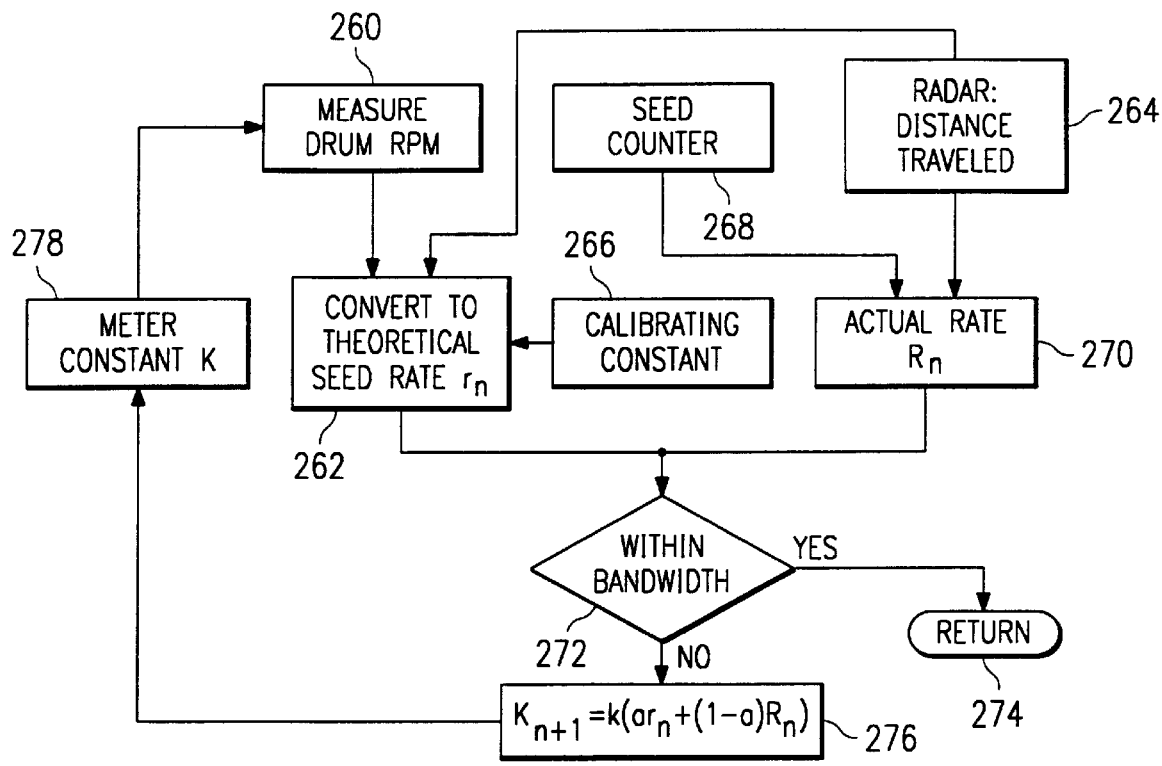
FIG. 10 is a schematic block diagram showing a simplified operating algorithm of a controller 130, as it is calculating a seed control constant.

FIG. 10 is a schematic block diagram showing a simplified control algorithm that can be used in controlling the rate of application of an agricultural product. In the illustrated example, the agricultural product is seed as applied by a drum singulator. The same scheme can be used in regulating the application of chemical products.

At step 260, the controller 130 ascertains the drum rpm, which is taken from the motor shaft speed sensor 228 (FIG. 9). As step 262, this drum rpm is converted to a theoretical seed rate $r_n$. The conversion between drum rpm and the theoretical seed rate is done as a function of the distance traveled, ascertained at step 264, and a calibrating constant 266. The distance traveled can be obtained from the ground speed sensor 210 and/or the true ground speed sensor 88.

At step 268 in FIG. 10, the seed counter 216 (FIG. 9) provides a count on the number of seeds which were actually released. As shown in FIG. 10, the distance traveled 264 and the number of seeds actually released during this time at step 268 are used to calculate an actual seed rate $R_n$ at step 270. Theoretical seed rate $r_n$, which is derived from the distance traveled step 264 and the drum RPM 260, is compared with the actual seed rate $R_n$ calculated in step 270. Since the theoretical seed rate $r_n$ is compared with the actual seed rate $R_n$ for a period n, to see whether the distance falls within a band width at step 272, if the actual rate and the theoretical rate are within some predetermined amount or band width, the procedure returns at step 274 and the period is incremented to n+1. If the actual rate $R_n$ and the theoretical seed rate $r_n$ are in excess of some predetermined time from each other, a new meter constant is calculated at step 276. The meter constant K for period n+1 is calculated according to a filtering function, such as shown at step 276 in FIG. 10 wherein:

$$K_{n+1}=k(ar_n+(1-a)R_n)$$

where k is another constant and a is a constant less than unity. This new meter constant $K_{n+1}$ is applied at step 278 to alter the rotational speed or RPM of the motor 226 (FIG. 9) reflected in the measured drum RPM at step 260 (FIG. 10).

It should be recognized that the control illustrated in FIG. 10 is simplified. Differences in commanded rate or real-time environmental factors as might be derived from the sensors 100 may be applied as multipliers when deriving the new meter constant $K_{n+1}$. (See discussion above relative to FIG. 8 and the description relative to FIGS. 2 and 3, with regard to the sensors 100).

Figure 11:
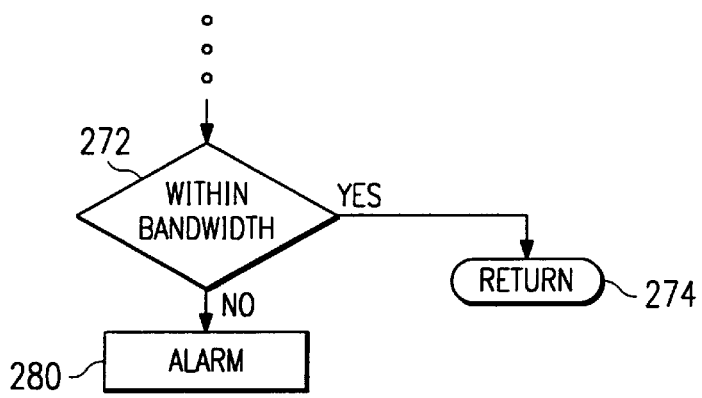
FIG. 11 is a variation of the algorithm illustrated in FIG. 10.
Figure 16:
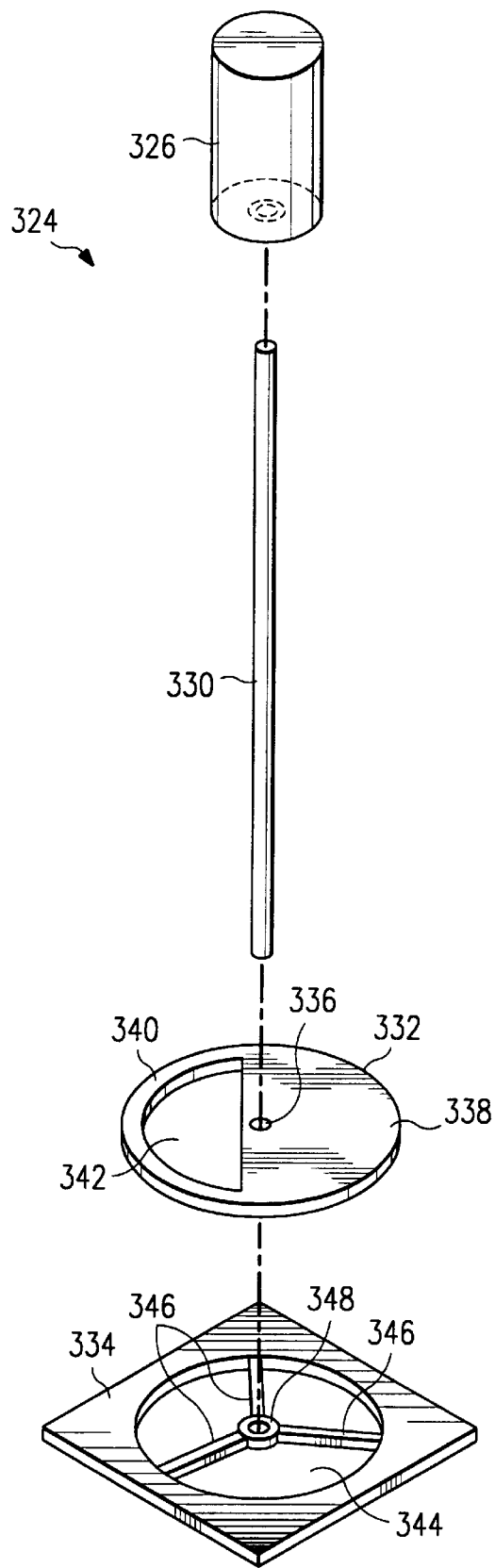
FIG. 16 is an exploded isometric view of a seed type switch assembly according to the invention.

FIG. 11 is a partial diagram of an algorithm similar to that shown in FIG. 10. However, instead of automatically adjusting the meter constant to take into any departure of the theoretical seed rate from the actual seed rate, the algorithm merely produces an alarm at step 280 if the difference between these two seed rates does not fall within a predetermined bandwidth at step 272. Otherwise, the program returns at step 274 as before. According to the algorithm shown in FIG. 11, the farmer would manually adjust the meter constant or would remedy whatever is causing the difference, such as a jammed dispenser, and would reset the controller 130.

In the embodiment illustrated in FIGS. 4 and 9, a data processing unit 150 has been assigned certain central data gathering and processing functions, while each of the controllers 130 have been assigned data gathering and control functions peculiar to their particular agricultural positions. Together, the controllers 130 and the DPU 150 form a processing means for the control of the entire agricultural device. Other divisions between DPU 150, on the one hand, and controller 130, on the other hand, could alternatively be devised, such that the functions of one are executed by the other. It is possible to centralize all control and data gathering functions in the DPU 150 and eliminate the controller 130; on the other hand, many of the functions of the DPU 150 could be distributed among the controllers 130.

Referring to FIGS. 12–16, a seed hopper 301 having the illustrated characteristics may be used at each of the row stations 96 along the toolbar 92. Hopper 301 may also be used as the central-fill seed hopper as shown in the embodiment of FIG. 1. The seed hopper includes a front wall 302, a rear wall 304, sidewalls 306, and a floor 308 which slopes downwards to a seed discharge outlet 310 such that seed at the bottom of the hopper 301 will slide down the floor 308 toward the outlet. The hopper 301 includes a top assembly 312 (see FIG. 13) which includes a lid (not shown) hinged onto top assembly 312 for loading seed into the hopper 301. Hopper 301 can be made of fiberglass or other materials such as steel. A dividing wall 314 within the hopper 301 forms multiple seed bins 316 and 318. Preferably the wall 314 is removably mounted so that hopper 301 can be configured for applying either one or two types of seed. The wall 314 can be secured by sliding its ends 320 and 322 into channels (not shown) formed within the front and rear walls 302 and 304, or can be secured by brackets. The wall 314, like the rest of the hopper 301, can be made of fiberglass, steel or other relatively rigid and environmentally impervious material. The top assembly 312 is preferably fastened with removable fasteners, such as bolts or latches, to provide the clearance for the sliding wall 314 into and out of the hopper 301 when top assembly 312 is removed.

A switch assembly 324 is provided within the hopper 301 to select seed from bin 316 or 318. The switch assembly 324 includes an electric motor 326 secured to the dividing wall 314 (e.g. with brackets 328, FIGS. 13 and 14), a shaft 330 above the seed discharge outlet 310, and a square frame 334 secured to the floor 308 between the seed bins 316 and 318. The type switch 208 (FIG. 9) may include a driver circuit for the motor 326, or the controller 130 could drive the motor 326 directly if appropriate power circuitry is included therein.

The motor 326 is preferably a servo motor including two built-in cams located on the final drive of a gear head. The cams activate built-in microswitches for generating signals which stop shaft 330 at either end of two angular positions spaced 180 degrees apart. The selected angular position depends upon the value of a type control signal received by the motor 326 from the controller 130. The motor 326 is similar to motors used in other agricultural applications, and is available from various motor suppliers. For example, agricultural sprayers use such a motor for turning a ball valve between two positions depending upon the state of the control signal. Alternatively, the motor 224 can include other rotary actuators and limited angle torque motors.

The circular plate 332 has a shaft aperture 336 for receiving and securing a shaft 330. The plate 332 includes a solid side 338 and a second side 340 (FIG. 16) with a circular segment aperture 342 which for example can extend through one-half of a revolution, although other aperture shapes can be used. The motor 326 and the plate 332 are mounted such that first and second sides 338 and 340 each can be completely within one of the seed bins 316 and 318. When the shaft 330 is stopped at the first angular position, the first side 338 is located within the seed bin 318, and the second side 340 is located within the seed bin 316. Thus, seeds stored in bin 316 can be discharged through the aperture 342, but seed stored in bin 318 is prevented from such discharge by the solid first side 338. Conversely, when shaft 330 is stopped at the second angular position, the first side 338 is within seed bin 316 and the second side 340 is within the seed bin 318. Thus, seed in bin 318 can be discharged through the aperture, while the discharge of seed from bin 316 is prevented. Therefore, the plate 332 selectively allows the discharge of seed from only one seed bin 316 or 318 based on the position of the shaft 330, which in turn is controlled by the value of a type control signal from the controller 130.

The square frame 334 includes a circular aperture 344 and may include struts 346 (FIG. 16) for holding a ring 348 within the aperture 344 and to journal shaft 330. The frame aperture 344 aligns with the plate aperture 342 regardless of the shaft position. Frame 334, therefore, does not block the flow of seed under any condition. The shape of Frame 334 may have other shapes depending upon the shape of the floor 308.

Referring to FIG. 17, another embodiment is shown in which the hopper 301 is divided into more than two bins. A second dividing wall 350 intersects the first dividing wall 314 to divide the hopper 301 into four seed bins 352–358. As shown, the bins have different capacities since bins 352, 354 are relatively large and bins 356, 358 are relatively small. Unequal capacities may be useful if only a small quantity of some seed types is needed. Alternatively, the second wall 350 could be removably mounted and be configured in a V-shape such that the bins are of equal capacity. The gate assembly 324 in this instance is modified by narrowing the semicircular aperture 342 in the circular plate 332 to a 90° circular segment, and by employing a motor 326 which is movable among four angular positions. Other bin configurations, such as forming three bins by an extending wall 350 between a sidewall 306 to a the first dividing wall 314, may be provided instead.

Figure 18:
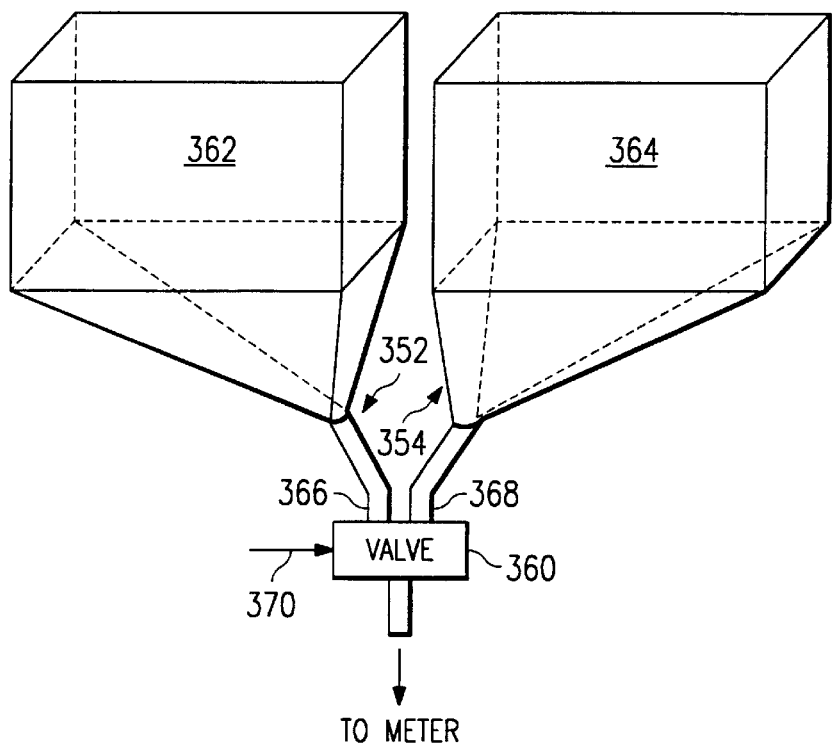
FIG. 18 is a schematic diagram of an alternative multi-bin seed distribution method.

Referring to FIG. 18, a further embodiment is shown in which the switch assembly includes an external valve 360 which receives seed from either of two seed bins 362 and 364. Each seed bin 362, 364 is fitted with an outlet conduit 366, 368 which connects the bin to the valve 360. The valve 360 responds to type control signals 370 from the local bus 202 (FIG. 8) to allow only one type of seed to pass through the meter.

Figure 19:
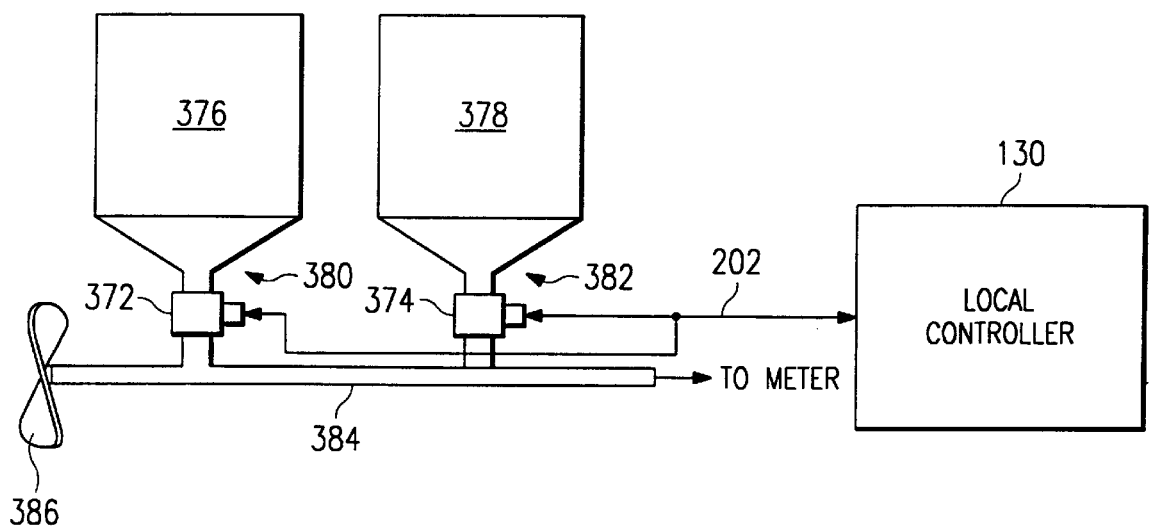
FIG. 19 is a third embodiment illustrating another variation for the planting of seed from multiple bins.

Referring to FIG. 19, another embodiment is shown in which the switch assembly includes a pair of external valves 372 and 374 which receive seed from either of two seed bins 376 and 378. The valve 372 and 374 are coupled to respective seed bin discharge outlets 380 and 382, and, in response to type control signals send over local bus 202 from the local controller 130, will permit one kind of seed to pass through a common seed supply tube 384. This embodiment is similar to the one illustrated in FIG. 1, in that air pressure from a fan 386 is employed and located on the implement 26 to push the seed to a seed meter (not shown).

Thus, disclosed is a multi-mode agricultural dispensing system in which agricultural product application rates and types vary among the row positions, and which may be adjusted in real-time based on actual environmental and product application data. The commanded rate may be calculated as a function of any of the several variables, either stored or acquired in real-time, such as soil depth, types and rates of other product supply, chemical concentrations in the soil, greenness, etc. While several embodiments of the present invention have been described in the above detailed description, the invention is intended to be limited only by the scope and spirit of the appended claims.

We claim:

1. Apparatus for applying an agricultural product to a field, comprising:

a vehicle for moving over the field;

processing means transported by the vehicle and coupled to a memory for storing a theoretical rate of application of the agricultural product, the processing means operable to generate a metering device control signal representative of said theoretical rate of application;

an agricultural product metering device coupled to the processing means for receiving said metering device control signal, said metering device dispensing a quantity of the agricultural product which varies according to the metering device control signal;

a sensor mounted on said vehicle and measuring an actual rate of application of the agricultural product being dispensed by said metering device, said sensor generating an actual rate signal;

the processing means coupled to said sensor for receiving said actual rate signal, the processing means deriving an actual rate of application from said actual rate signal and comparing said actual rate with said stored theoretical rate; and the processing means altering said metering device control signal as a function of the said actual rate of application of the agricultural product being dispensed and the theoretical rate in order that the actual rate and the theoretical rate may more closely match.

2. The apparatus of claim 1, wherein said agricultural product is selected from the group consisting of seeds, fertilizers, herbicides and pesticides.

3. The apparatus of claim 1, wherein said agricultural product is seeds, said metering device comprising a singulator, said actual rate signal being a function of a number of seeds dispensed in a predetermined time interval.

4. The apparatus of claim 1, wherein said metering device comprises a fluted roll movable with respect to a gate.

5. The apparatus of claim 1, including a controller for receiving said metering device control signal, said controller altering said metering device control signal as a function of the difference of the actual rate and the theoretical rate.

6. The apparatus of claim 1, wherein said apparatus further includes a user input device coupled to the processing means and adaptable to generate a manual application signal for overriding the processing means' automatic calculation of the metering device control signal, the processing means transmitting a manual metering device control signal to said metering device responsive to receiving said manual application signal.

7. The apparatus of claim 1, wherein said metering device is mounted on a toolbar towed by said prime mover.

8. Apparatus for applying an agricultural product to a field, comprising:

a vehicle for moving over the field;

processing means transported by the vehicle and coupled to a memory for storing a theoretical rate of application of the agricultural product, the processing means operable to generate a metering device control signal representative of said theoretical rate of application;

an agricultural product metering device coupled to the processing means for receiving said metering device control signal, said metering device dispensing a quantity of the agricultural product which varies according to the metering device control signal;

a sensor mounted on said vehicle and measuring an actual rate of application of the agricultural product being dispensed by said metering device, said sensor generating an actual rate signal;

the processing means coupled to said sensor for receiving said actual rate signal, the processing means deriving an actual rate of application from said actual rate signal and comparing said actual rate with said stored theoretical rate;

the processing means altering said metering device control signal as a function of the said actual rate of application of the agricultural product being dispensed and the theoretical rate in order that the actual rate and the theoretical rate may more closely match; and said processing means altering said metering device control signal as a function of an old value of the control signal and a control signal change, the change derived as a function of the actual rate and the theoretical rate of application of the agricultural product.

9. The apparatus of claim 8, wherein said processing means does not alter said metering device control signal if the difference between the actual rate and the theoretical rate of application falls within a predetermined deadband.

10. Apparatus for dispensing an agricultural product, comprising:

a prime mover for moving the apparatus across an agricultural field in a direction of travel;

a tool bar coupled to said prime mover and having a length oriented at an angle to said direction of travel, a plurality of agricultural product metering devices mounted along said tool bar;

processing means conveyed by said vehicle and coupled to each of said metering devices to transmit respective agricultural metering device control signals thereto in order to control, on an individual metering device basis, the dispensing of the agricultural product onto the field;

a geographical location device coupled to the processing means and supplying a geographical location signal thereto, the processing means deriving a geographical location of each of said metering devices as a function of said geographical location signal;

a memory for storing an agricultural application prescription map, said prescription map storing a quantity of agricultural product to be dispensed which varies according to the geographical location of each metering device within the field, the processing means generating the metering device control signals as a function of their geographical locations and said agricultural application prescription map.

11. The apparatus of claim 10, wherein said agricultural product is selected from the group consisting of seeds, fertilizer, pesticides and herbicides.

12. Apparatus for dispensing an agricultural product, comprising:

a prime mover for moving the apparatus across an agricultural field;

at least one agricultural product metering device coupled to said prime mover for being moved across said agricultural field;

processing means coupled to said metering device and coupled to a memory, said memory storing a map of said field containing data concerning crop greenness derived from an image taken of the field from thereabove;

a geographical location device mounted on said apparatus and generating a geographical location signal, said processing means adapted to receive said geographical location signal and to derive a geographical location of said metering device therefrom, said processing means retrieving a datum from said map based on said geographical location signal, said processing means generating a metering device control signal as a function of said geographical location and said datum.

13. A The apparatus of claim 12, wherein the processing means includes a processor mounted on said prime mover.

14. Apparatus for dispensing an agricultural product, comprising:

a prime mover for moving the apparatus across an agricultural field;

at least one agricultural product metering device coupled to said prime mover for being moved across said agricultural field;

processing means conveyed by the prime mover and coupled to said metering device;

a memory coupled to the processing means and adaptable to store a map of soil depths of said field;

a geographical location device mounted on said apparatus and generating a geographical location signal, said processing means adapted to receive said geographical location signal and to derive a geographical location of said metering device therefrom, said processing means retrieving a soil depth datum from said map based on said geographical location signal, said processing means generating a metering device control signal as a function of said geographical location and said soil depth datum.

15. The apparatus of claim 14, wherein said processing means includes a processor mounted on said prime mover.

16. Apparatus for applying an agricultural product to a field, comprising:

a prime mover vehicle for moving over the field;

processing means conveyed by said vehicle, said processing means coupled to a memory for storing a theoretical rate of application of the agricultural product, said processing means operable to generate a metering device control signal representative of said theoretical rate of application;

an agricultural product metering device coupled to the processing means for receiving said metering device control signal, said metering device dispensing a quantity of the agricultural product which varies according to the metering device control signal;

a sensor conveyed by said vehicle and measuring an actual rate of application of the agricultural product being dispensed by said metering device, said sensor generating an actual rate signal;

the processing means coupled to said sensor for receiving said actual rate signal, the processing means deriving an actual rate of application from said actual rate signal and comparing said actual rate with said stored theoretical rate, the processing means generating an alarm signal if the actual rate is greater than some predetermined rate difference from the stored theoretical rate; and an alarm circuit coupled to the processing means for generating an alarm responsive to receiving said alarm signal, said alarm adaptable to warn a user of said apparatus that said metering device requires recalibration.

17. The apparatus of claim 16, and further comprising an agricultural implement towed by the prime mover vehicle, the agricultural product metering device and the sensor mounted on the agricultural implement, the processing means including a controller mounted on the agricultural implement in proximity to the sensor and the agricultural product metering device.

18. Apparatus for dispensing an agricultural product, comprising:

a prime mover for moving the apparatus across an agricultural field;

at least one agricultural product metering device coupled to said prime mover for being moved across said agricultural field; and processing means coupled to said metering device and a memory, said memory storing a plurality of two dimensional layers of data concerning a like plurality of characteristics taken of the field, a geographical location device conveyed by said prime mover and generating a geographical location signal, the processing means adapted to receive said geographical location signal and to derive a geographical location of said metering device therefrom, the processing means retrieving at least one datum from said memory based on said geographical location, the processing means generating a metering device control signal as a function of said geographical location and said at least one datum.

19. Apparatus for dispensing an agricultural product, comprising:

a prime mover for moving the apparatus across an agricultural field;

at least one agricultural product metering device coupled to the prime mover for being moved across the agricultural field;

processing means coupled to the metering device and a memory, the memory storing a prescription map for the field by which at least one datum relating to a desired prescription is specified for each of a plurality of locations in the field;

a geographical locator coupled to the processing means for transmitting a geographical position signal thereto, the processing means deriving at which field location the vehicle is disposed as a function of the geographical position signal;

the processing means generating a metering device control signal as a function of the datum for the current field location, the metering device operating as a function of a value of the metering device control signal; and a sensor mounted on the prime mover for determining a value of the datum of the agricultural product as actually applied to the current location, the sensor transmitting an actual application signal to the processing means, an actual application map stored in the memory, the processing means deriving an actual application datum from the actual application signal and inserting the actual application datum into the actual application map.

20. The apparatus of claim 19, wherein the at least one datum is selected from the group consisting of a rate of application of the agricultural product and a type of a selected one of a predetermined plurality of product types which may be applied to the field.

21. The apparatus of claim 19, wherein the agricultural product is selected from the group consisting of seed, fertilizer, herbicides and pesticides.

22. The apparatus of claim 19, wherein the actual application map is matched to the prescription map.

23. Apparatus for dispensing an agricultural product, comprising:

a vehicle for moving the apparatus across an agricultural field in a direction of travel;

a tool bar coupled to the vehicle for being moved across the agricultural field, a length of the tool bar being disposed at an angle to the direction of travel, the toolbar being divided into a plurality of row positions;

at each row position, at least one agricultural product metering device for dispensing an agricultural product onto the field, a controller mounted at the row position and coupled to the metering device for transmitting a control signal thereto, the metering device dispensing an amount of the agricultural product in response to receiving the control signal from the controller;

a processor mounted on the vehicle, a memory coupled to the processor for storing an agricultural prescription map of the agricultural field, geographical location means coupled to the processor for transmitting a geographical location signal to the processor, the processor deriving a location of the vehicle in the field from the geographical location signal and retrieving at least one theoretical prescription datum from the prescription map as a function of the geographical location, the processor establishing at least one agricultural product commanded rate, at least one agricultural product commanded type, or a combination of rate and type, and a path coupling the processor to each controller coupled to a metering device at each of the row positions, the processor selectively transmitting a rate/type signal indicative of commanded rate, commanded type or both to one or more of the controllers, the controllers changing a value of the control signal as a function of a change in the prescription datum received by the controller.

24. The apparatus of claim 23, wherein the processor retrieves prescription data in a sequence determined by the changing geographical location of the vehicle, the processor transmitting a rate/type signal derived from a retrieved transmission datum to one or more controllers only when the rate/type signal is a value that is different from a previously retrieved prescription datum.

25. The apparatus of claim 23, wherein the processor derives a current geographical position for each agricultural metering device on the toolbar based on a value of the geographical location signal, the processor accessing a plurality of prescription data from the prescription map each corresponding to the geographical position of a respective row location, the processor selectively transmitting a rate/type signal for a particular row location to the controller at that particular row location.

26. The apparatus of claim 23, and further comprising, at each row position, a sensor for sensing what was actually applied by the metering device, an actual application signal transmitted by the sensor to the controller at the row position.

27. The apparatus of claim 23, and further comprising, at each row position, a plurality of metering devices, a local bus interconnecting each of the plurality of metering devices at the row location with the controller at the row position.

28. The apparatus of claim 23, wherein the tool bar is towed by the vehicle.

29. The apparatus of claim 23, wherein the processor establishes the at least one agricultural product commanded rate, at least one agricultural product commanded type, or a combination of rate and type, based on a plurality of retrieved data for the asserted geographical location.

30. The apparatus of claim 23, and further comprising, at each row position, a plurality of agricultural product metering devices for dispensing a plurality of agricultural products onto the field, the processor transmitting a rate/type signal to the controller which is indicative of a rate or type of each of the plurality of agricultural products.

31. The apparatus of claim 30, when the plurality of agricultural products are selected from the group consisting of seed, fertilizers, pesticides and herbicides.

* * * * *